(12) United States Patent
Pulsipher

(10) Patent No.: US 7,979,870 B1
(45) Date of Patent: Jul. 12, 2011

(54) METHOD AND SYSTEM FOR LOCATING OBJECTS IN A DISTRIBUTED COMPUTING ENVIRONMENT

(75) Inventor: Darren W. Pulsipher, Alpine, UT (US)

(73) Assignee: Cadence Design Systems, Inc., San Jose, CA (US)

( * ) Notice: Subject to any disclaimer, the term of this patent is extended or adjusted under 35 U.S.C. 154(b) by 1353 days.

(21) Appl. No.: 11/297,609

(22) Filed: Dec. 8, 2005

Related U.S. Application Data

(60) Provisional application No. 60/634,496, filed on Dec. 8, 2004, provisional application No. 60/634,481, filed on Dec. 8, 2004.

(51) Int. Cl.
G06F 9/46 (2006.01)
G06F 13/00 (2006.01)
G06F 15/16 (2006.01)

(52) U.S. Cl. ......... 719/330; 709/201; 709/202; 709/203
(58) Field of Classification Search .................. 719/313, 719/315–316, 330; 712/28
See application file for complete search history.

(56) References Cited

U.S. PATENT DOCUMENTS

| | | | |
|---|---|---|---|
| 4,825,354 A | | 4/1989 | Agrawal et al. |
| 5,319,758 A | | 6/1994 | Arai et al. |
| 5,381,534 A | | 1/1995 | Shi |
| 5,459,871 A | | 10/1995 | Van Den Berg |
| 5,802,291 A | * | 9/1998 | Balick et al. .................. 709/202 |
| 5,832,484 A | | 11/1998 | Sankaran et al. |
| 5,903,891 A | | 5/1999 | Chen et al. |
| 6,009,266 A | * | 12/1999 | Brownell et al. ............. 719/315 |
| 6,182,154 B1 | * | 1/2001 | Campagnoni et al. ........ 719/315 |
| 6,182,158 B1 | | 1/2001 | Kougiouris et al. |
| 6,223,200 B1 | | 4/2001 | Barnes et al. |
| 6,226,618 B1 | | 5/2001 | Downs et al. |
| 6,247,041 B1 | | 6/2001 | Krueger et al. |
| 6,269,373 B1 | * | 7/2001 | Apte et al. ...................... 707/10 |
| 6,321,264 B1 | | 11/2001 | Fletcher et al. |
| 6,378,066 B1 | | 4/2002 | Lewis |
| 6,418,484 B1 | | 7/2002 | Radia |
| 6,438,616 B1 | * | 8/2002 | Callsen et al. ................ 719/316 |
| 6,505,210 B1 | * | 1/2003 | Frey et al. ................. 707/103 R |

(Continued)

OTHER PUBLICATIONS

Final Office Action dated Jul. 21, 2009 for U.S. Appl. No. 11/297,621.

(Continued)

Primary Examiner — Qing Wu
(74) Attorney, Agent, or Firm — Vista IP Law Group, LLP

(57) ABSTRACT

Method and system for locating objects in a computing grid. Requests for one or more objects are received from a client or other requesting entity. A persistent object locator is distributed across the grid and searches the grid for a reference to or handle on the requested object. The persistent object locator includes an internal object locator element (IOL) that resides locally, e.g., on the client, and an external object locator element (EOL) that resides on one or more other servers that are external relative to the client. The EOL is initiated if the IOL cannot locate the requested object locally. The EOL searches the grid for the requested object and if the object is available, delivers the reference to or handle on the requested object to the requesting entity. Objects can also be registered to the POL for future use. References to objects can also be deleted from the POL in the event of a communication failure or if a server or process terminates as expected.

45 Claims, 21 Drawing Sheets

U.S. PATENT DOCUMENTS

| | | | |
|---|---|---|---|
| 6,594,671 B1 * | 7/2003 | Aman et al. | 707/103 R |
| 6,651,047 B1 | 11/2003 | Weschler, Jr. | |
| 6,678,714 B1 | 1/2004 | Olapurath et al. | |
| 6,681,242 B1 | 1/2004 | Kumar et al. | |
| 6,704,806 B1 | 3/2004 | Decker | |
| 6,772,216 B1 | 8/2004 | Ankireddipally et al. | |
| 6,792,606 B2 * | 9/2004 | Halter et al. | 719/315 |
| 6,961,716 B2 | 11/2005 | Rhodes | |
| 6,993,771 B1 * | 1/2006 | Hasha et al. | 719/318 |
| 7,043,731 B2 * | 5/2006 | Ramaswamy | 718/105 |
| 7,051,098 B2 | 5/2006 | Masters et al. | |
| 7,184,967 B1 | 2/2007 | Mital et al. | |
| 7,379,994 B2 | 5/2008 | Collazo | |
| 7,506,046 B2 | 3/2009 | Rhodes | |
| 7,571,181 B2 | 8/2009 | Rhodes | |
| 7,584,474 B2 | 9/2009 | Gondi et al. | |
| 2002/0099821 A1 | 7/2002 | Hellerstein et al. | |
| 2002/0116205 A1 | 8/2002 | Ankireddipally et al. | |
| 2003/0037136 A1 | 2/2003 | Labovitz et al. | |
| 2003/0088708 A1 * | 5/2003 | Lewallen | 709/315 |
| 2003/0100957 A1 | 5/2003 | Chaffee et al. | |
| 2003/0120701 A1 | 6/2003 | Pulsipher et al. | |
| 2003/0120708 A1 | 6/2003 | Pulsipher et al. | |
| 2003/0120709 A1 | 6/2003 | Pulsipher et al. | |
| 2003/0120710 A1 | 6/2003 | Pulsipher et al. | |
| 2003/0120764 A1 | 6/2003 | Laye et al. | |
| 2004/0019898 A1 * | 1/2004 | Frey et al. | 719/330 |
| 2004/0025163 A1 | 2/2004 | Babutzka et al. | |
| 2004/0078105 A1 | 4/2004 | Moon et al. | |
| 2005/0188088 A1 | 8/2005 | Fellenstein et al. | |
| 2005/0198247 A1 | 9/2005 | Perry et al. | |
| 2005/0240668 A1 | 10/2005 | Rolia et al. | |
| 2005/0283786 A1 | 12/2005 | Dettinger et al. | |
| 2006/0048157 A1 | 3/2006 | Dawson et al. | |

OTHER PUBLICATIONS

Non-Final Office Action dated Nov. 10, 2009 for U.S. Appl. No. 11/297,604.
Non-Final Office Action dated Nov. 12, 2009 for U.S. Appl. No. 11/297,621.
Non Final Office Action dated Apr. 2, 2008 for U.S. Appl. No. 11/297,621.
Final Office Action dated Oct. 21, 2008 for U.S. Appl. No. 11/297,621.
Non Final Office Action dated Mar. 16, 2009 for U.S. Appl. No. 11/297,621.
L. Ferriera, et al., "Introduction to Grid Computing With Globus", *IBM Redbooks*, Sep. 2003.
Non-Final Office Action dated Mar. 31, 2010 for U.S. Appl. No. 11/297,268.
Final Office Action dated Apr. 12, 2010 for U.S. Appl. No. 11/297,621.
Non-Final Office Action dated Mar. 24, 2010 for U.S. Appl. No. 11/297,562.
Final Office Action dated Jun. 8, 2010 for U.S. Appl. No. 11/297,604.
Final Office Action dated Oct. 20, 2010 for U.S. Appl. No. 11/297,268.
Final Office Action dated Aug. 16, 2010 for U.S. Appl. No. 11/297,562.
Non-Final Office Action dated Aug. 3, 2010 for U.S. Appl. No. 11/297,621.
Final Office Action dated Nov. 23, 2010 for U.S. Appl. No. 11/297,621.
Non-Final Office Action dated May 3, 2011 for U.S. Appl. No. 11/297,604.

* cited by examiner

Figure 2-3- Work States

WORK STATE

STATE OF A TASK

*Task Timing*

| Name | | Time | |
|---|---|---|---|
| 1 | BuildCycle(B01) | | Finishes when all sub-work is finished |
| 1.1 | Build3rdParty(B01) | | Note: Finishes after 1.1.1 and 1.1.2 |
| 1.1.1 | Build3rdPartyTool(B01, "1") | | Finishes after 1.1.1.1 |
| 1.1.1.1 | make tool1 | | |
| 1.1.2 | Build3rdPartyTool(B01, "2") | | Finishes after 1.1.2.1 |
| 1.1.2.1 | make tool2 | | |
| 1.2 | preBuild.pl B01 | Start after 1.1 | |
| 1.3 | BuildComponent(B01, "1") | Start after 1.2 | finish after 1.3.3 |
| 1.3.1 | premake.pl component1 | | |
| 1.3.2 | make component1 | Start after 1.3.1 | |
| 1.3.3 | postmake.pl component1 | Start after 1.3.2 | |
| 1.4 | BuildComponent(B01, "2") | Start after 1.2 | finish after 1.4.3 |
| 1.4.1 | premake.pl component2 | | |
| 1.4.2 | make component2 | Start after 1.4.1 | |
| 1.4.3 | postmake.pl component2 | Start after 1.4.2 | |
| 1.5 | BuildComponent(B01, "3") | Start after 1.2 | finish after 1.5.3 |
| 1.5.1 | premake.pl component3 | | |
| 1.5.2 | make component3 | Start after 1.5.1 | |
| 1.5.3 | postmake.pl component3 | Start after 1.5.2 | |
| 1.6 | postMake.pl B01 | Start after 1.3, 1.4, and 1.5 | |

FIG 4F

STATES OF A JOB

| | Name | Time |
|---|---|---|
| 1 | BuildCycle(B01) | Created \| Pending \| Blocked \| Active \| Completed |
| 1.1 | GatherCode(B01) | Finishes after 1.1.1 and 1.1.2 |
| 1.1.1 | MergeCode(B01) | |
| 1.1.2 | Get3rdParty(B01) | |
| 1.2 | BuildComponent(B01, "1") | Start After 1.1 \| Finishes after 1.2.* |
| 1.2.1 | BuildProduct(B01) | Start w/Parent |
| 1.2.2 | BuildComponent(B01, "1") | Start w/Parent |
| 1.2.3 | BuildComponent(B01, "2") | Start w/Parent |
| 1.2.4 | BuildComponent(B01, "3") | Start w/Parent |
| 1.3 | TestProduct(B01) | Starts when 1.2 is finished \| Finishs after 1.3.* |
| 1.3.1 | TestComponents(B01) | Start with 1.3 |
| 1.3.1.1 | TestComponent(B01, "1") | Start with 1.3.1 \| Finishes After 1.3.1.* |
| 1.3.1.2 | TestComponent(B01, "2") | Start with 1.3.1 |
| 1.3.1.3 | TestComponent(B01, "3") | Start with 1.3.1 |
| 1.3.2 | TestSystemIntegration(B01) | Start with 1.3.1 |
| 1.3.3 | TestSystemFlow(B01) | Start with 1.3.1 |
| 1.4 | PackageProduct(B01) | Start after 1.3 |
| 1.4.1 | Gather3rdParty(B01) | |
| 1.4.2 | GatherBinaries(B01) | |
| 1.4.3 | CreateInstallation(B01) | |
| 1.4.4 | CreatePackage(B01) | |

FIG 44

(Expected Termination)

METHOD AND SYSTEM FOR LOCATING OBJECTS IN A DISTRIBUTED COMPUTING ENVIRONMENT

CROSS REFERENCE TO RELATED APPLICATIONS

This application claims priority under 35 U.S.C. §119 of U.S. Provisional Application No. 60/634,496, filed Dec. 8, 2004, entitled "Method and Apparatus for Distributed Entities," the contents of which are incorporated herein by 5 reference.

This application claims priority 35 U.S.C. §119 of U.S. Provisional Application No. 60/634,481, filed Dec. 8, 2004, entitled "Method and Apparatus for Operation of Distributed Computing Systems," the contents of which are incorporated herein by reference.

This application is related to U.S. application Ser. Nos. 10/247,970, which is entitled "MECHANISM FOR MANAGING PARALLEL EXECUTION OF PROCESSES IN A DISTRIBUTED COMPUTING ENVIRONMENT" and is now U.S. Pat. No. 7,159,217 filed on Sep. 19, 2002, Ser. No. 10/251,230, which is entitled "MECHANISM FOR MANAGING EXECUTION OF INTERDEPENDENT AGGREGATED PROCESSES" and is now U.S. Pat. No. 7,117,500 filed on Sep. 19, 2002, Ser. No. 10/251,019, which is entitled "MECHANISM FOR MANAGING EXECUTION ENVIRONMENTS FOR AGGREGATED PROCESSES" and is now U.S. Pat. No. 7,299,466 filed on Sep. 19, 2002, and Ser. No. 10/251,747, which is entitled "HIERARCHICALLY STRUCTURED LOGGING FOR COMPUTER WORK PROCESSING" and is Dec. 20, 2001, the contents of which are incorporated herein by reference.

FIELD OF THE INVENTION

The present invention relates generally to distributed computing system and, more particularly, to locating objects within a distributed computing system.

BACKGROUND

Distributed or grid computing provides the ability to share and allocate processing requests and resources among various nodes, computers or server farm(s) within a grid. A server farm is generally a group of networked servers or, alternatively, a networked multi-processor computing environment, in which work is distributed between multiple processors. Workload is distributed between individual components or processors of servers. Networked servers of a grid can be geographically dispersed. Grid computing can be confined to a network of computer workstations within a company or it can be a public collaboration.

Resources that are distributed throughout the grid include various objects. An object is a self-contained module of data and associated processing that resides in a process space. There can be one object per process or tens of thousands of objects per process.

A server farm environment can include different classes of resources, machine types and architectures, operating systems, storage and hardware. Server farms are typically coupled with a layer of load-balancing or distributed resource management (DRM) software to perform numerous tasks, such as managing and tracking processing demand, selecting machines on which to run a given task or process, and scheduling tasks for execution.

In distributed computing systems or grids, however, various objects are often scattered in disparate locations throughout the grid or on a computing system that is external to the grid. Due to the complex nature of such systems, it can become difficult, if not impossible, for a requesting client, such as a requesting object or process, to know the location of or reference to the requested object within the grid. Thus, a need continues to exist for a system and method that can effectively locate an object within a distributed computing grid.

SUMMARY

According to one embodiment is a method of processing requests for objects in a distributed computing grid. The method includes receiving a request from a client for an object residing on the distributed computing grid and searching for the requested object on the distributed computing grid using a distributed object locator. The distributed object locator includes an internal object locator element that resides locally on the client and an external object locator element that resides on an external server of the grid.

According to another embodiment is a method of processing requests for objects in a geographically distributed computing grid. The method includes receiving a request from a client for an object residing on the grid and initially searching the client for the requested object using an internal object locator element of a distributed object locator. The internal object locator element resides locally on the client. If the internal object locator element knows a reference to the requested object, the method further includes delivering the reference to the requested object and communicating with the requested object using the delivered reference. Otherwise, the method proceeds with searching for the requested object across the network on server of the geographically distributed grid using an external object locator element of the distributed object locator.

According to a further alternative embodiment is a system for processing requests for objects in a distributed computing grid. The system includes internal and external object locators. The internal object locator element resides locally on the client, and the external object locator element resides on a server across the network. The internal object locator element receives a request from a client for an object residing on the grid and initially searches for the requested object locally on client. If the internal object locator element does not locate the requested object, then the external object locator element searches for the requested object in one or more servers across the network.

In various embodiments, a class of the requested object can be determined, and the a search for the requested object can be conducted by searching for a process that handles the class. Further, a process that handles a class of a requested object can be registered with an external object locator element. The reference to the requested object can be a handle on the object or a routing path to the requested object in the grid. Further, in various embodiments, the internal object locator element locally resides in a first process space in the client, and the external object locator element resides in a second process on an external server of the distributed computing grid. The object locator can be distributed among some or all of the servers of the grid.

BRIEF DESCRIPTION OF THE DRAWINGS

Referring now to the drawings, in which like reference numbers represent corresponding parts throughout, and in which:

FIG. 4F illustrates timing of tasks;

FIG. 4H illustrates timing of jobs;

DETAILED DESCRIPTION OF ILLUSTRATED EMBODIMENTS

Embodiments of the invention enhance distributed computing systems or environments, such as grids, by providing a distributed object locator that locates requested objects on the grid. The object locator ("OL") receives a request for an object from a requesting entity, such as a local server or client, a process or an object (generally "client" or "requesting entity.") The OL determines whether the reference to or a handle on the requested object already exists. The OL is distributed among various servers, nodes or server farms of a grid and can perform searches locally on the client and, if necessary, on other grid servers that are external to the client and across a communications link or network (generally network). The OL determines where the requested object resides in process space and connects other servers, objects or processes to the requested object to allow for communication with the requested object.

Embodiments can be executed in a single computer (e.g., a client computer) or in multiple computers, e.g., between a client and one or more servers across a network connection. The OL searches for objects and determines whether and where the requested object resides in process space, and provides a connection to the requested object to allow for communication with the requested object, e.g., to obtain information from the object or provide information to the object.

If the OL cannot locate the requested object locally, a process can be launched on the grid to search for the requested object externally and serve up that object and establish the necessary communications with the requesting entity. Embodiments of the invention provide significant improvements to processing object requests over grid networks by advantageously allowing objects that are scattered throughout the grid to be quickly and efficiently located and, if necessary, generated.

Embodiments of the invention can be executed in a single computer (e.g., a client computer) or in multiple computers, e.g., between a client and one or more servers across a network connection and in various distributed computing environments. FIGS. 1-4I illustrate one exemplary computing environment or "grid" in which system and method embodiments for gathering, modeling and presenting resource data can be implemented. A "grid" is generally known as a collection of nodes, resources or hosts, each of which contributes one or more resources to the grid. The following description of an exemplary grid is provided for purposes of explanation and illustration. Persons skilled in the art will appreciate that embodiments can be used in other distributed computing environments.

Figure 1:
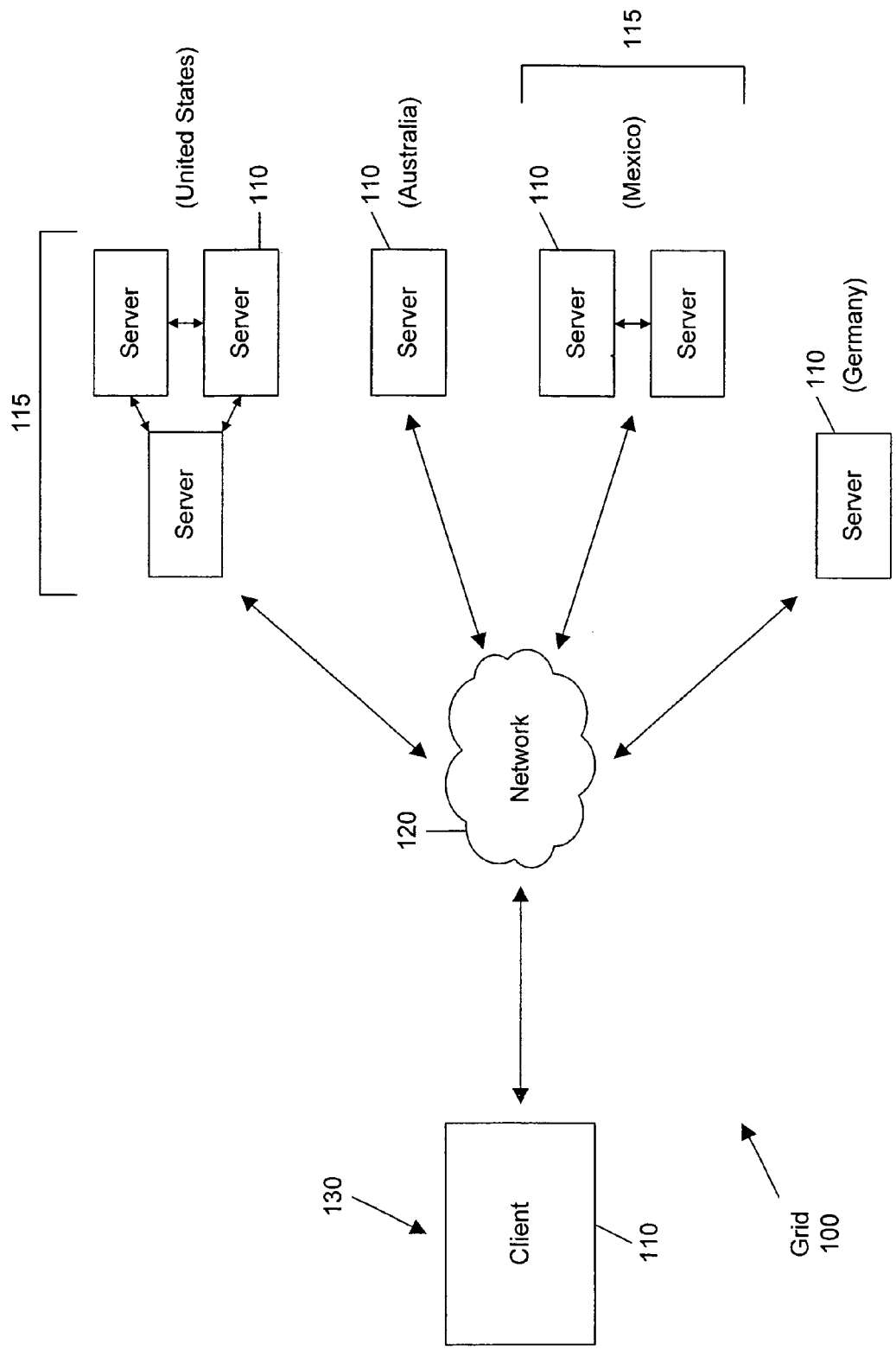
FIG. 1 is a block diagram generally illustrating a grid computing environment in which embodiments can be implemented.
Figure 2:
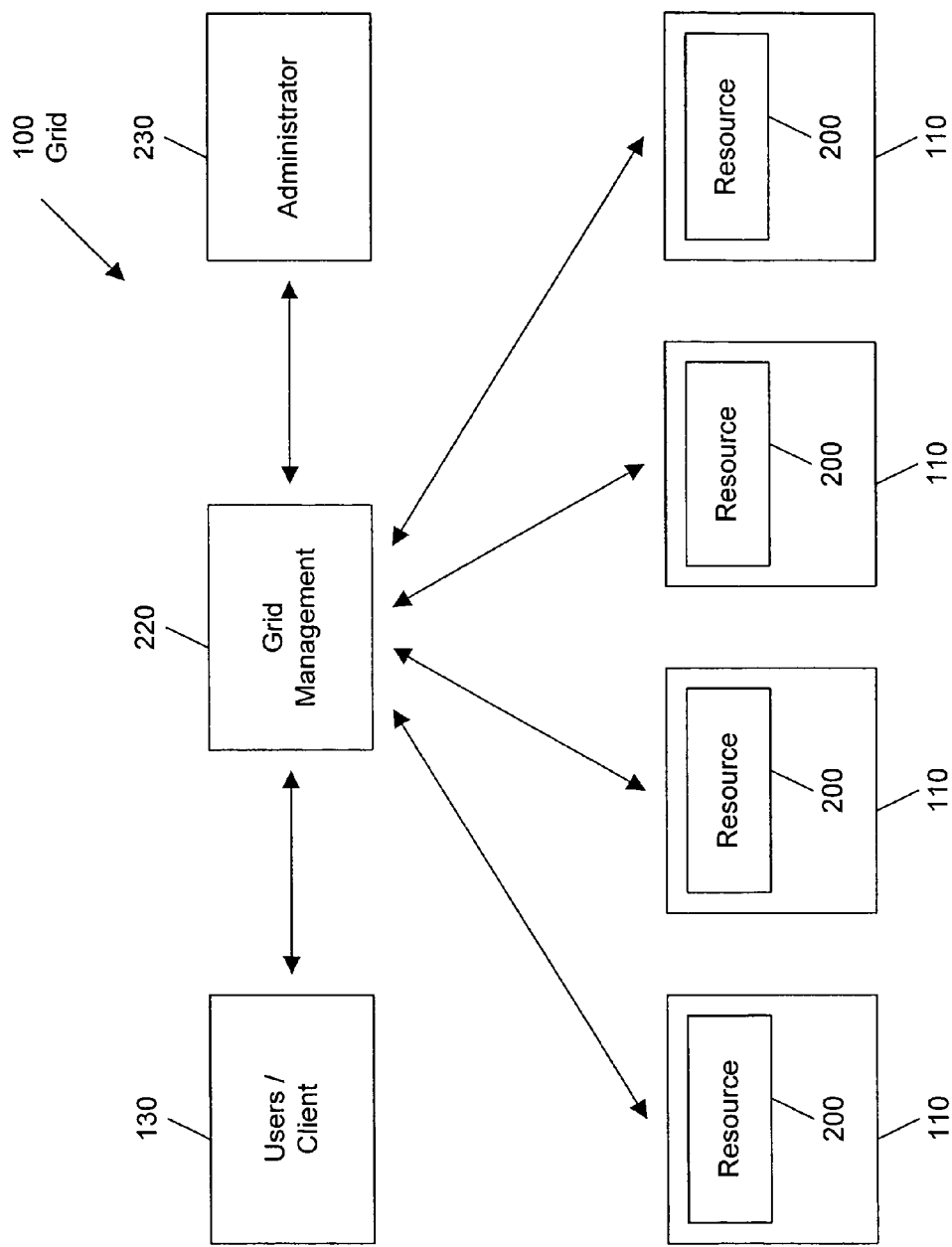
FIG. 2 is a block diagram further illustrating grid management and resources in a grid computing environment.

FIGS. 1 and 2 generally illustrate one exemplary computing grid 100 that includes various numbers of servers 110 or groups of servers or server farms or clusters 115, which are connected via a communication link 120. The communication link 120 can be a network connection, such as a Local Area Network (LAN), a Wide Area Network (WAN), and a Public Switched Telephone Network (PSTN). One computer 130 is identified as the client or the requesting entity, which issues a request for a resource from one or more of the servers 110. The request can be made by, for example, a client process or an object This specification generally refers to a client requesting entity for purposes of explanation, not limitation.

One or more servers 110 in one location can be connected to one or multiple or all of the other servers 110 of the grid via network 120. A server farm 115 or group of servers can be one node or component in a grid 100. Thus, a grid 100 can include different numbers of nodes or server farms 115. The grid 100 can also be distributed across different geographic domains, such as across offices (e.g., offices in the same or different location), different cities, states, countries and continents. Thus the grid may be local and/or external. For purposes of illustration, not limitation, FIG. 1 illustrates a grid 100 that is distributed across different continents. The client or requesting entity 130 is considered to be local or internal and the other servers 110 connected to the network 120 are external relative to the client 130. The grid 100 can be used to, for example, run an application on multiple servers, allocate computing resources among grid components, provide parallel processing and provide enhanced data storage and processing capabilities. The grid 100 can also be used to allocate and share equipment, software and licenses. For example, if resource on a server 110 is overloaded, a job request can be directed to another server in the grid that has that resource so that the request can be processed. This specification generally refers to a grid in the context of distributed computing and resource allocation, however, grid environments can also be used with other applications, such as communications involving cell phones and personal digital assistants (PDAs).

Referring to FIG. 2, a grid 100 is generally an interconnected set of nodes or servers 110, which host one or more resources 200. The same resource 200 can reside on one or more or all of the servers 110. The resources 200 and organization and control thereof can be managed 220 and controlled by an administrator 230.

Figure 3:
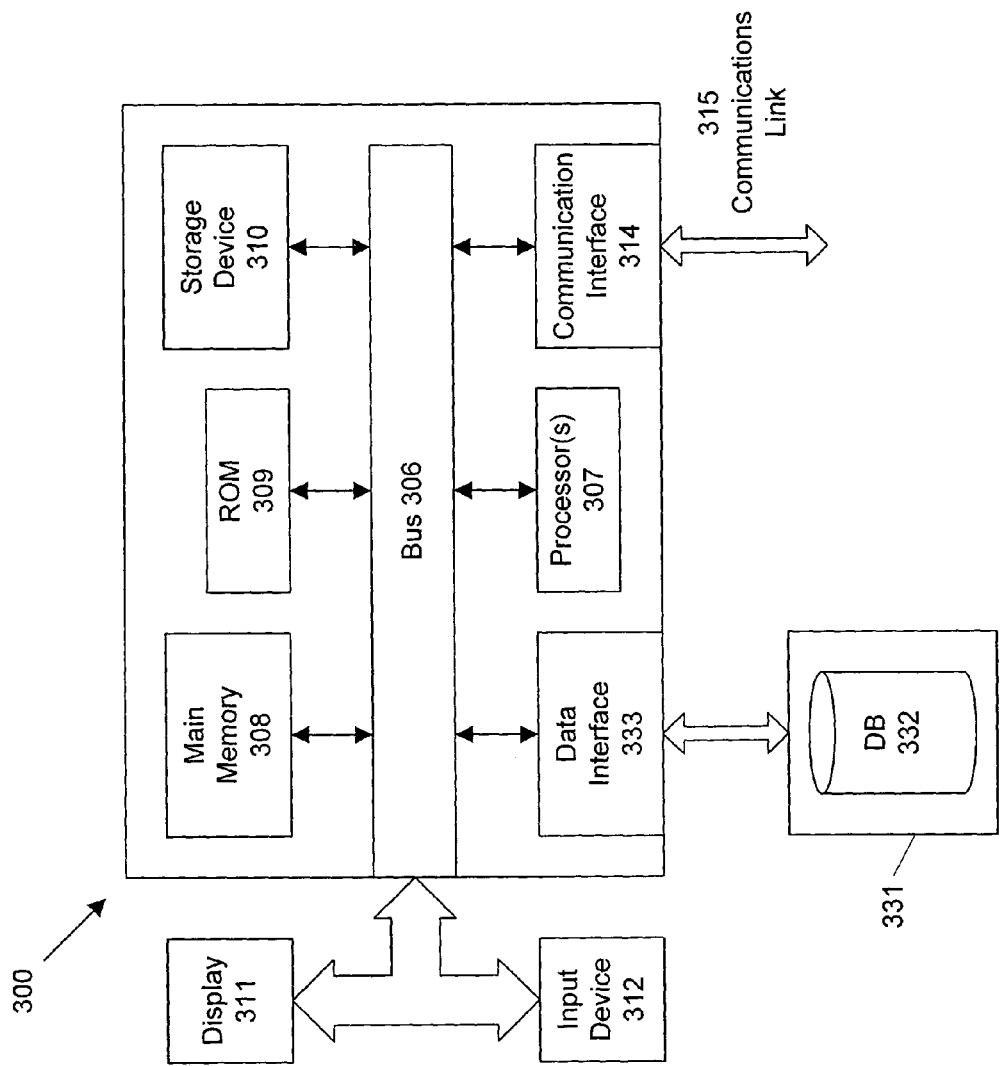
FIG. 3 is a block diagram of an exemplary server of a computing grid.

One exemplary computer system or server 110 that can be used in the grid 100 is shown in FIG. 3. The terms server, computer and computer system are broadly used to describe any computing device that can store and run one or more programs to implement method and system embodiments. Sequences of instructions of embodiments can be performed by a single computer system or server 110 or two or more computer systems or servers 110 coupled by a communication link 315, which serves as an interface to a communications network 120.

Each computer system 300 may include a communication interface 314 coupled to a bus 306. The interface 314 provides two-way communication between computer systems 300 through communication link 315 and network 120. The communication interface 314 transmits and receives electrical, electromagnetic or optical signals that include data streams representing various types of signal information, e.g., instructions, messages and data. The communication link 315 connects one computer system 300 with another computer system 300. For example, the communication link 315 may be a LAN, in which case the communication interface 314 may be a LAN card, or the communication link 315 may be a PSTN, in which case the communication interface 314 may be an integrated services digital network (ISDN) card or a modem, or the communication link 315 may be the Internet, in which case the communication interface 314 may be a dial-up, cable or wireless modem. Other communication interfaces and links can be utilized as needed. The computer system 300 may transmit and receive messages, data, and instructions, including program, such as an application or code, through its respective communication link 315 and communication interface 314. The received program code may be executed by the respective processor(s) 307 as it is received, and/or stored in the storage device 310, or other associated non-volatile media, for later execution.

The computer system 300 can operate in conjunction with a data storage system 331, e.g., a data storage system that contains a database 332 that is accessible by the computer system 300. The computer system 300 communicates with the data storage system 331 through a data interface 333 coupled to the bus 306. The system 300 transmits and receives electrical, electromagnetic or optical signals, that include data streams representing various types of signal information, e.g., instructions, messages and data. In embodiments, the functions of the data interface 333 may be performed by the communication interface 314.

The system 300 includes a bus 306 or other mechanism for communicating instructions, messages and data, collectively, information, and one or more processors 307 coupled with the bus 306 for processing information. The system 300 also includes a main memory 308, such as a random access memory (RAM) or other dynamic storage device, coupled to the bus 306 for storing dynamic data and instructions to be executed by the processor(s) 307. The main memory 308 also may be used for storing temporary data, such as variables and other intermediate information during execution of instructions by the processor(s) 307.

The system 300 may further include a read only memory (ROM) 309 or other static storage device coupled to the bus 306 for storing static data and instructions for the processor(s) 307. A storage device 310, such as a magnetic disk or optical disk, may also be provided and coupled to the bus 306 for storing data and instructions for the processor(s) 307. The computer system 300 may be coupled via the bus 306 to a display device 311, such as, a cathode ray tube (CRT), for displaying information to a user. An input device 312, e.g., alphanumeric and other keys, is coupled to the bus 306 for communicating information and command selections to the processor(s) 307.

An individual computer system 300 performs specific operations by their respective processor(s) 307 executing one or more sequences of one or more instructions contained in the main memory 308. Such instructions may be read into the main memory 308 from another computer-usable medium, such as the ROM 309 or the storage device 310. Execution of the sequences of instructions contained in the main memory 308 causes the processor(s) 307 to perform the processes described herein. Hard-wired circuitry may be used in place of or in combination with software instructions. Persons skilled in the art will appreciate that embodiments can be implemented using other computer systems and hardware and/or software.

Further, embodiments may be stored on various types of computer-usable medium, which is any medium that provides information or is usable by the processor(s) 307. Exemplary media include non-volatile and volatile media. Non-volatile media, i.e., media that can 25 retain information in the absence of power, includes the ROM 509, CD ROM, magnetic tape, and magnetic discs. Volatile media, i.e., media that can not retain information in the absence of power, includes the main memory 308.

Figure 4A:
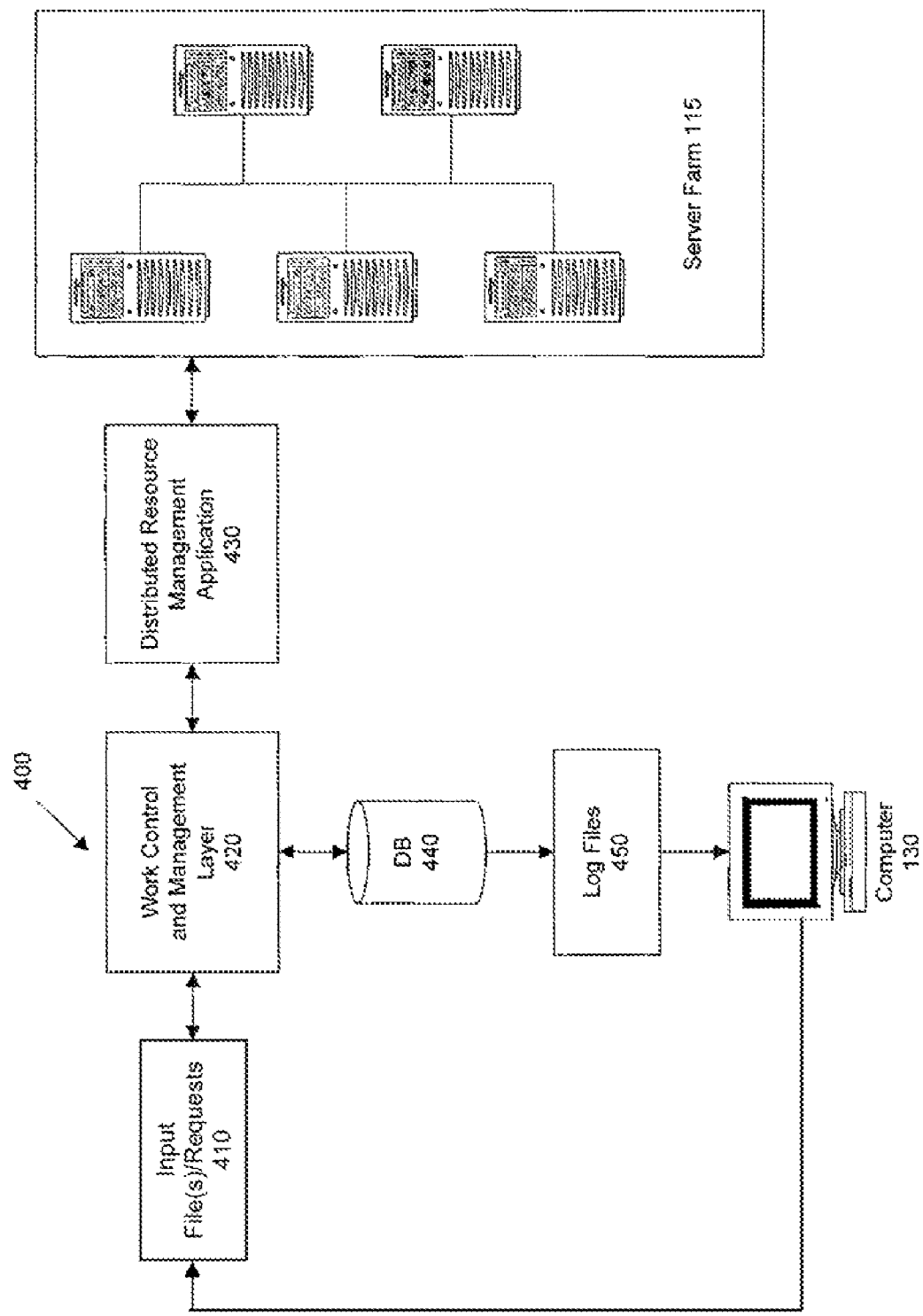
FIG. 4A is a block diagram generally illustrating a grid computing environment having a work control and resource management elements.

Referring to FIG. 4A, according to one embodiment, control and management 220 of the grid 100 and requests issued over the grid 100 is performed using gridMatrix 400, developed by Cadence Design Systems, Inc., 2655 Seely Avenue San Jose, Calif. 95134. The gridMatrix 400 is middleware or software that provides users and administrators control over jobs in the grid. More specifically, the gridMatrix 400 is a job definition, control monitoring and reporting software program.

The exemplary system or environment includes a workstation or client computer 130, from which a user can create and submit one or more input files 410. The input files 410 can be, for example, Job Request Language (JRL) files, that define a work request specifying one or more jobs having one or more executable task commands. Processes use JRL in conjunction with the control and management layer 420, one example of which is the gridMatrix 400, to manage execution of work in the grid 100.

The gridMatrix 400 interprets JRL files 410 and compiles them into objects, which execute on a server 110 or server farm 11 or invoke executables to be run on a server 110. Typically, the objects are passed through the DRM application 430 that schedules and manages work to be run on the processors 107 of a server 110. More specifically, the gridMatrix 400 interprets JRL work requests 410, instantiates distributed objects, invokes software servers to manage execution of commands, and interfaces with DRM 430 applications.

The commands and data correspond to the work that is defined in the input file 410. Thus, the gridMatrix 400 interprets and acts upon the input file 410 and causes the DRM application 430 to execute task commands on a server 110. The database 440 stores information related to many of the processes described herein.

For example, task commands constituent to a piece of work are essentially instantiated into computing objects, which are maintained persistently in the database 440. A persistent object is an object that continues to exist after the program that created it has been unloaded and is stored for later use. Persons skilled in the art that "persistent" in the context of an object generally refers to the duration of the object. Embodiments, therefore, are not to be limited to objects that exist for particular periods of time. Rather, persistent objects may be permanent or temporary and exist for various durations.

Objects are also made to be distributable so that they are accessible to different processes within the work execution flow. Implementation of a conventional distributed object model architecture, such as Common Object Request Broker (CORBA), can be used. CORBA or another suitable standard provides the ability to communicate between objects. A database module of the gridMatrix 400 contains base classes for all objects in the database 440.

An artifact is a piece of data that is used, generated or discarded while working with the grid. Artifacts that are used by the gridMatrix 400 include job definitions, work, tasks, jobs, and workspaces. Each of these artifacts is described in further detail below.

A job definition defines jobs and tasks that will be run when a job is submitted to the gridMatrix 400. The gridMatrix 400 allows users to add job definitions via JRL into the gridMatrix Database. The gridMatrix 400 keeps statistics on job runs, and this information can be presented in text and graphic formats to optimize job definitions for greater efficiency. JRL is the primary mechanism used to import a job definition into the gridMatrix 400. Job definitions can be added to the gridMatrix 400 and stored in a gridMatrix database. One benefit of adding a job definition is that the gridMatrix 400 can store historical information about consecutive job runs which use the same job definition. This information can be analyzed to help determine where the problems are in the process and help optimize the process for decreased execution time. After running a job against a job definition, the definition can be changed to fix problems with the process, to optimize this process, or to add more jobs to the definition.

The gridMatrix 400 can gather statistics from running jobs against the same job definition several times. Trends of execution time, duration, and pending time are given in a graph to show how the process is performing over time. Duration is the wall clock amount of time to run the job from submission to completion. Pending is the amount of time it takes the DRM 430 to dispatch the jobs to machines in the grid 100. Sequential is the cumulative amount of time it takes to run the tasks on machines in the grid 100 (i.e., if run sequentially, how long it would take).

Figure 4B:
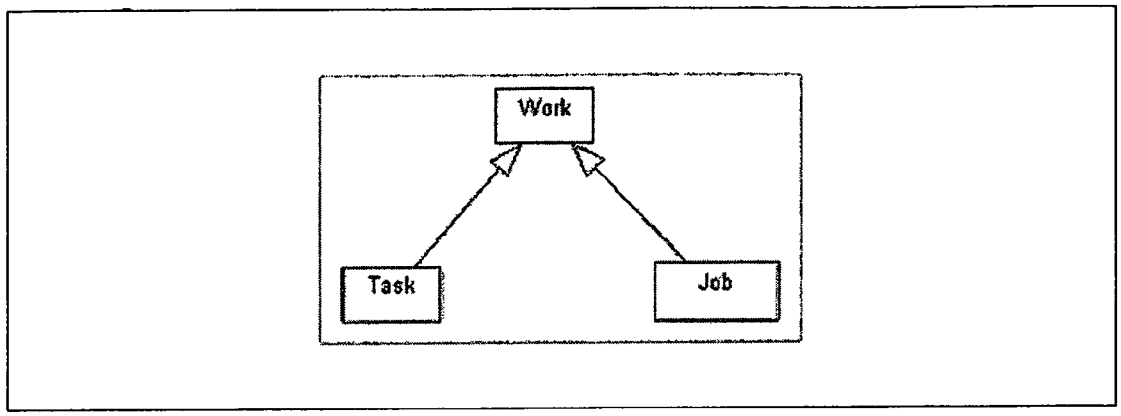
FIG. 4B illustrates jobs and tasks as different types of work.

Referring to FIG. 4B, "work" or "worfkow" represents all types of work, including jobs, topjobs and tasks. Work, and constituent jobs, can be defined with one or more JRL files. Work and workflow are generic terms for anything that the gridMatrix 400 can execute and control. Thus, "work" and "workflow" are generic terms for anything that the work control and management layer 420 can control, execute, or cause to be executed.

Work may include processes to compile or build a program, to create file directories, install applications, maintain job dependencies, etc. In other words, work includes whatever a user needs to be performed or processed.

Figure 4C:
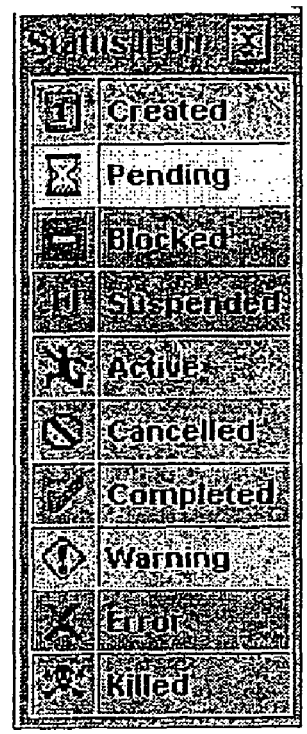
FIG. 4C illustrates states of work.
Figure 4D:
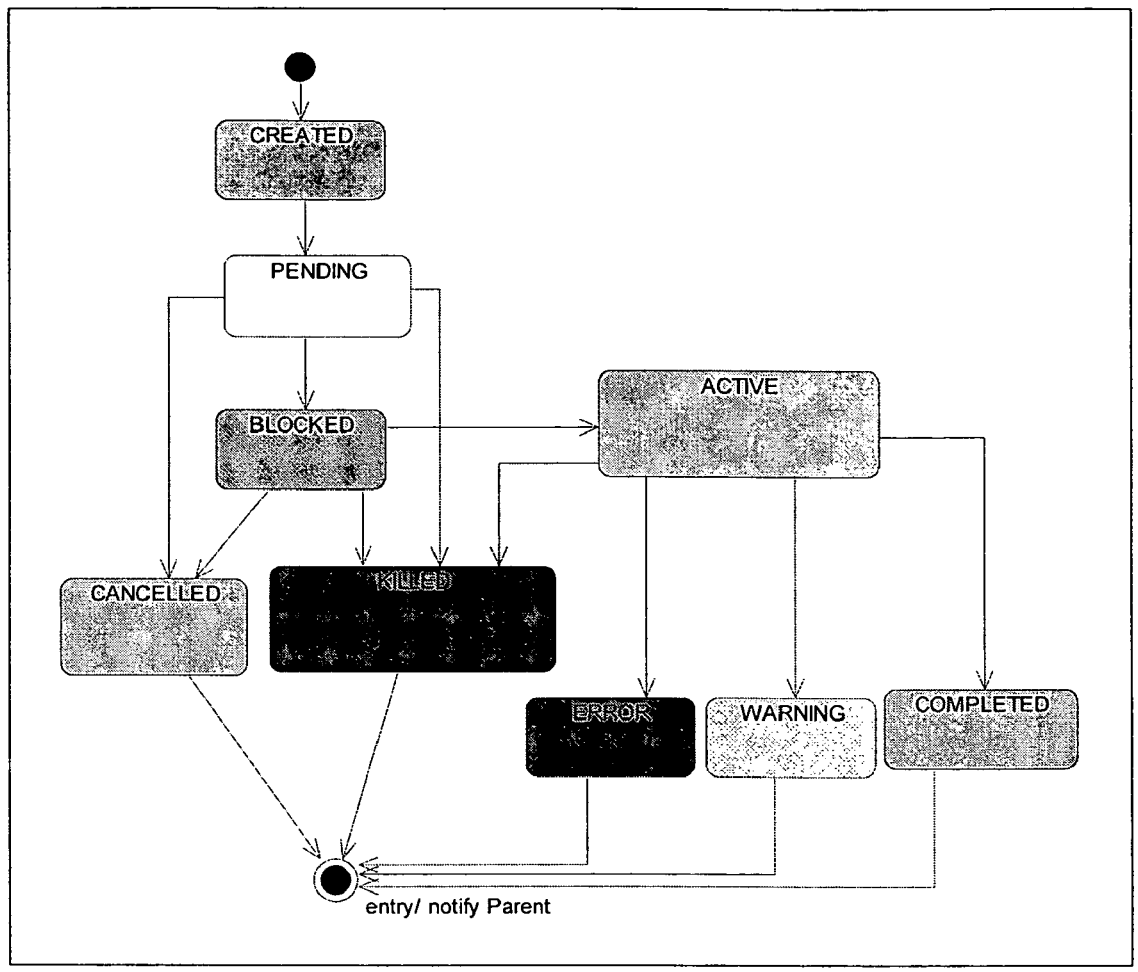
FIG. 4D further illustrates states of work.

Referring to FIGS. 4C and 4D, according to one embodiment, there are nine work states in the gridMatrix 400. Each states determines the behavior of the work and limits the next state(s) that it can transition into.

More specifically, the created state is the starting state of all work in the gridMatrix 400. Work will move from the created state to a scheduled state when scheduled for execution. The "pending" state follows the created state and denotes that work has been scheduled, but has not been sent to be executed. When work is sent for execution, it moves to the "blocked" state. In other words, after work has been pending, it moves to the blocked state, which denotes that the work has not met the criteria to be executed. When the criterion for the work has been met, the work will be moved to the active state. Tasks may be suspended until manual intervention to resume is performed. When work has met the criteria for leaving the blocked state, it moves to the active state. Work that completes its activity without warning, error or termination, transitions from the active state to the completed state. This state is also referred to as the successfully completed state. Work that is completed with some warnings, but no errors or termination, transitions from the active to warning state. The conditions for completion of work with warnings can be specific to the type of work. Work that completes with some errors, but not termination, transitions from the active to error state. The conditions for completion of work with an error can be specific to the type of work. Work properly terminated using, for example, a "matrix kill" command, after the created state, but before entering one of the finished states (completed, warning and error), moves to the killed state. The actions and conditions for a killed state can be specific to the different types of work. Work can be cancelled when criteria for execution cannot be satisfied. This can be due to a number of different factors.

A task is represented in a job definition as described by JRL, much the same as the job is represented. A task is a type of work and inherits all of the operations from work. A task represents the actual command that needs to be called in the grid 100. In other words, a task is an atomic unit of work that is performed on a server 110 and is a command that is executed on one or more processors of a networked multiprocessor computing environment.

Figure 4E:
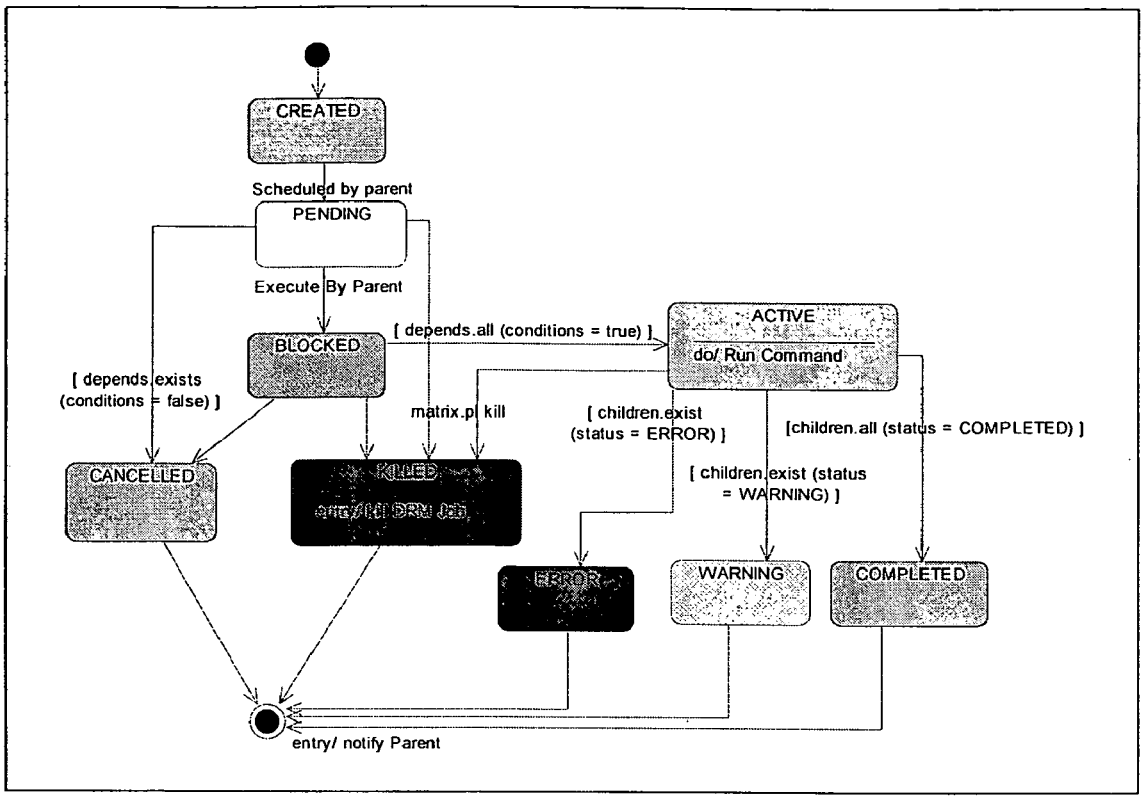
FIG. 4E illustrates states of a task.

Referring to FIG. 4E, a task has certain states. According to one embodiment, a task has the same states as work. A task begins in the created state. A task is moved from the created state to a pending state when a parent job schedules the task. The task is scheduled when the parent job is moved to the active state. Tasks in the pending state can be moved to the blocked state. A task is moved from the pending state to a blocked state when the task is submitted to the DRM 430. The task stays in the blocked state until the DRM 430 executes it. All tasks must move through the blocked state before actually performing work. The longer a task is in the blocked state, the longer it sits in the DRM 430 queues waiting to be distributed to a machine.

The job will continue to stay in the blocked state until all of its dependencies have been satisfied. Tasks may be suspended until manual intervention to resume is performed. A task is moved from the blocked state to an active state when the task is actually executed on a host machine for the task.

A task is moved from the active state to a completed state when the corresponding command has finished executing. After the job is set to the completed state, it notifies its parent that it has finished. This is a type of state propagation that begins a chain of notification when a task's parent is notified. The parent will only change its state to completed when all of its children have the state completed.

A task can be moved from the active state to a warning state, after which the job notifies its parent that it has finished. This is a type of state propagation that begins a chain of notification when it's parent is notified. The parent will only change its state to warning when all of its children are in a finished state (completed, warning or error) and at least one in the warning state. A task is moved from the active state to an error state when the command executed returns a exit value that is not 0 (which is the standard failure exit code for commands). After the job is set to the error state, it notifies its parent that it has finished. This is a type of state propagation that begins a chain of notification when it's parent is notified. The parent will only change its state to error when one of its children have the state error. A task transitions from a previous (not finished) state to the killed state when a gridMatrix kill command is issued. The user can specify any of the jobs or tasks by ID when killing a job. When a task is moved to this state, it will kill all processes and sub processes of the executing command. The state propagation moves both up and down the tree. After the job completes "killing" its subwork, it notifies its parent that it has finished. The parent will only change its state to killed when all of its children are in a finished or a killed state. A killed state also results if a timeout is set for a job or task and the job doesn't finish in the set time. A task transitions from a pending or blocked state to a cancelled state when a parent is canceled. Since tasks do not have dependencies, they can not be cancelled directly. Rather, only their parent jobs can be cancelled, and as a result the task will never run, and it is marked cancelled.

Tasks in a job are run sequentially. A task does not start until all previous subworks are finished. If the previous subwork is a task, then it does not start until that task is completed. If the previous subwork is a job, then the task will not start until all previous jobs are complete.

FIG. 4F illustrates one example of timing of tasks. As can be seen in FIG. 4F, tasks are not in a pending state until its parent job is in an activate state (1.1.1.1.). Further, parent jobs are not completed until all of the tasks are completed (1.3). Additionally, tasks that are neat to each other in the job definition are run sequentially (1.5.1.3). When a task's command finishes, the exist status is set in the gridMatrix. For example, an error can be indicated by =!0, completed is indicated by =0.

A job is a type of work and represents a collection of jobs and/or tasks to be executed in the grid 100. Tasks are grouped together to form jobs. A job can be executed, controlled and reported by the management layer 420. Jobs can have zero or more sub-works, which can be a task or another job (i.e., sub-job). JRL provides the capability of defining jobs and passing parameters to the job definitions, which are instantiated as job objects. The parameters are used to create commands that represent tasks that execute on a server. The results of a task are maintained in a log file 450.

The gridMatrix 400 runs all jobs in parallel. All jobs can be run at the same time. Placing dependencies between the jobs lets the gridMatrix 400 know what order the individual tasks should be executed. The gridMatrix 400 gives the user the ability to define dependencies between jobs within the job definition. A job with a dependency, or multiple dependencies, does not execute until all dependencies are satisfied. More specifically, jobs encompass prerequisites and dependencies and can depend on any other job or subjob in a job definition. Job dependencies define the order that jobs are executed. A job may have 0 or more subworks, which can be a task or a job. This layering of jobs allows users to define complex multi-leveled job definitions in the gridMatrix 400. Thus, a user can break down complex processes into small and manageable steps that can be analyzed and controlled.

Figure 4G:
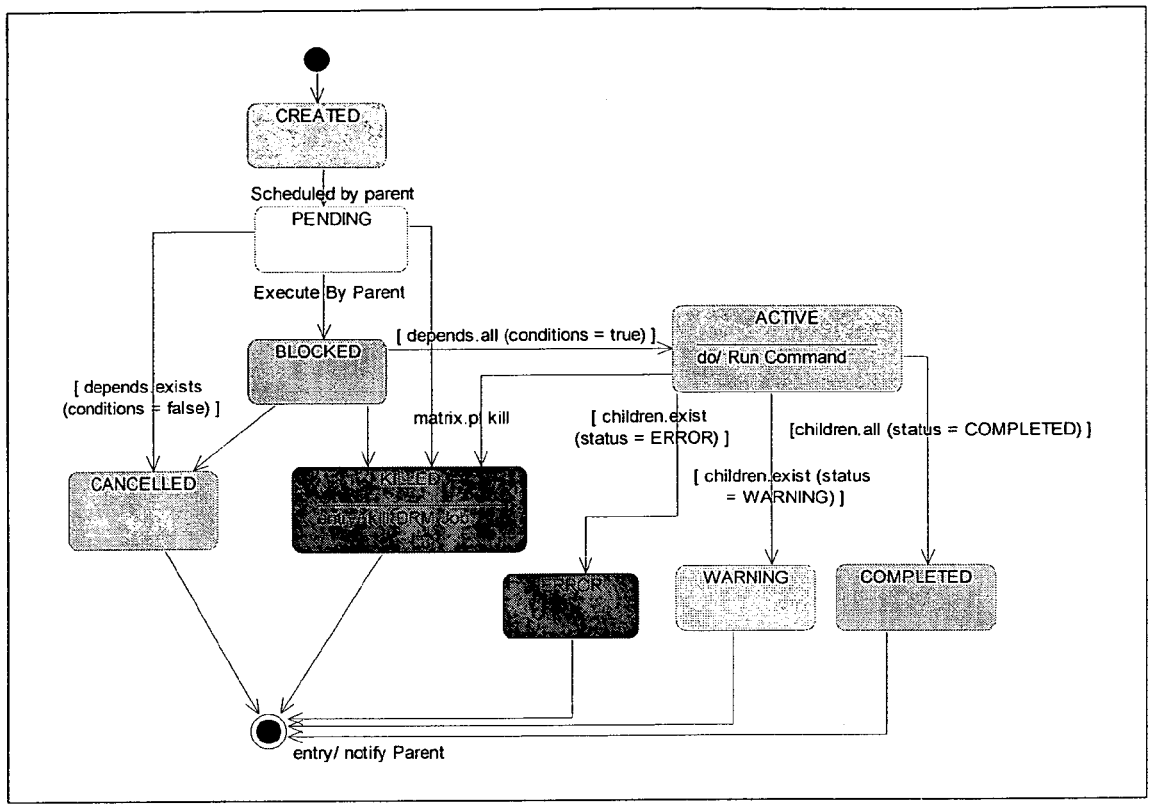
FIG. 4G illustrates states of a job.

Referring to FIG. 4G, a job has states that are similar to the states of work. The names of the states are the same, but there are additional ramifications to the states of a job. All jobs begin in the created state. A job is moved from the created state to a pending state when the parent job schedules the job. If the job is the top level job, it is scheduled by the gridMatrix when the job is submitted to be run. A job is moved from the pending state to a blocked state when the parent job executes the job. All jobs must move through the blocked state before actually performing work. The job will continue to stay in the blocked state until all of its dependencies have been satisfied. Tasks may be suspended until manual intervention to resume is performed.

A job is moved from the blocked state to an active state when all the dependencies of the job have been satisfied. Each time a dependent job finishes, a message is sent to the job that it depends on, and the gridMatrix 400 checks the dependency criteria for all of the dependent jobs. If all criteria are satisfied, the job can move into the active state. When a job is in the active state, all subworks are first scheduled (subworks are moved to the pending state) and then the gridMatrix 400 will execute all subwork of the job (all subworks are moved to the active state). This propagation of state continues to the leaf nodes of the job aggregation tree. The timing diagram for the job shows the propagation of state.

A job is moved from a pending or blocked state to a canceled state when the job's dependencies cannot be satisfied, e.g., when conditional dependencies are used. For example, if a job has a dependency on another job finishing in the error state and the job finishes in the completed state, then the job will be moved into the cancelled state and will never execute. After a job is moved into the cancelled state, it notifies its parent it has finished. This is another type of state propagation, but unlike the active state propagation that moves down the tree, this propagation goes from child to parent.

A job is moved from the active state to a completed state when all of its subworks have been moved to the completed state. When a subwork finishes, it notifies its parent that it has finished. The parent job checks the status of all of its subwork and sets the state to completed if all subwork is completed. After the job is sent to the completed state, it notifies its parent that it has finished. This is another type of state propagation, but unlike the active state propagation that moves down the tree, this propagation moves from child to parent. The parent will only change its state to completed when all of its children have the state completed.

A job is moved from an active state to a warning state when all of the job's subworks have been moved to a finished state (completed, warning or error) with some subworks state being warning. When a subwork finishes, it notifies its parent. The parent job checks the status of all of its subwork and sets the state to warning if at least one of the subworks is in the warning state. After the job is set to the warning state, it notifies its parent that it has finished. This is another type of state propagation, but unlike the active state propagation that moves down the tree, this propagation moves from child to parent. The parent will only change its state to warning when all of its children are in a finished state (completed, warning or error) and at least one in the warning state.

A job transitions from an active state to an error state when all of its subworks have been moved to a finished state (completed, warning or error) with at least one in the error state. When a subwork finishes, it notifies its parent that it has finished. The parent job checks the status of all of its subwork and sets the state to error if at least one of the subworks is in the error state. After the job is sent to the error state, it notifies its parent that it has finished. This is another type of state propagation, but unlike the active state propagation that moves, down the tree, this propagation goes from child to parent. The parent will only change its state to error when all of its children are in a finished state (completed, warning or error) and at least one in the error state. A job transitions from a previous (not finished) state to the killed state when a kill command is used. The user can specify any of the jobs or tasks by ID when killing a job. When a job is moved to this state, it will set the state of all of its subwork that is not finished to the killed state. This propagation is similar to the active state propagation as it travels down the job aggregation tree "killing" all of the children down to the leaf nodes of the tree. In addition to moving down the tree, the state propagation moves up the tree in the same manner as the other finished states. After the job has "killed" its subwork, it notifies its parent that it has finished. The parent will only change its state to killed when all of its children are in a finished state or killed state.

FIG. 4H illustrates one example of timing of jobs. Subjobs are not submitted until a parent job is in an active state. (1.2; children 1.21-4). Further, all jobs pass through a blocked state before becoming active. Jobs with dependencies are put into a blocked state until dependent jobs are completed. For example, as shown in FIG. 4H, 1.3 starts after 1.2 finishes. Further, jobs are not completed until all children jobs are completed. This is true for all finished states (completed, warning and error).

Tasks are executed in an execution environment. The task's execution environment consists of environment variables and a directory hierarchy or working directory. The gridMatrix 400 allows users to define the directory hierarchy and working directory through a concept named workspace. All tasks are run with respect to a workspace. Workspace creation is controlled and monitored by the management layer 420 or the gridMatrix 400. After execution of the tasks within a given workspace, the resources associated with the given workspace are automatically deconfigured, or purged so that resources are freed up for use by other jobs. Further details concerning work, jobs, subjobs, tasks and workspaces are provided in the provisional and non-provisional applications that were incorporated herein by reference.

Figure 4I:
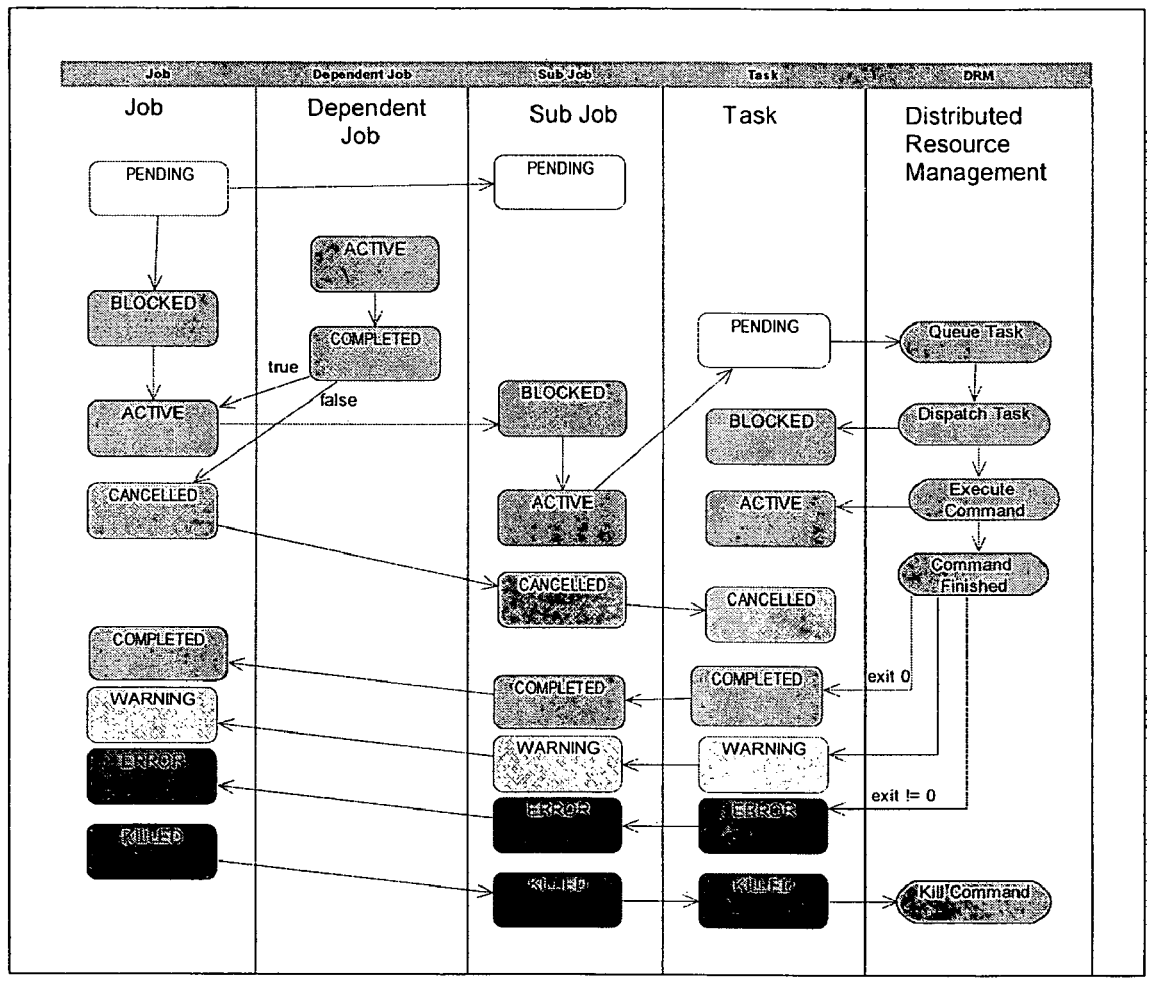
FIG. 4I illustrates how jobs, tasks and a distributed management system of a distributed computing environment interact with each other.

FIG. 4I illustrates how jobs, tasks and the DRM 430 interact with each other. The illustrated example shows how a job with a dependent subjob interacts. More specifically, the job is placed in a pending state by its parent. The job transitions to a Blocked state automatically. The dependent job moves to a completed state from the active state. If the condition on the dependency evaluates to true, the job is moved to an active state. If the condition of the dependency evaluates to false, the job is moved to a cancelled state, which is propagated down to a subjob and the task of the job.

The subjob is moved to a blocked state. The subjob has no dependencies and is moved to an active state automatically. The task is moved to a pending state and is sent to the DRM 430 to be executed. When the task begins execution, the task is marked active. When the task is completed, it can assume one of three states. First, if the exit code is zero, then task assumes a completed state. If the exit code is non-zero, then the state will be an error state. A warning state can be set by a command through a module. The status is passed to the subjob and then up to the job. A job can be killed, and this is propagated down to an individual task. The DRM 430 is notified to kill the command.

Embodiments are directed to an object locator (OL) or persistent object locator (POL) (generally OL or "Object Locator") that can execute on a grid environment, one example of which is described above and shown in FIGS. 1-4I. Embodiments of the invention can be implemented in the grid environment 100 and the gridMatrix 400, as described above, or in other networking environments and with other management software or middleware 420 besides gridMatrix 400. Accordingly, the above description of the gridMatrix 400 is provided for purposes of explanation and illustration and to provide one example system that can be used with embodiments.

The OL locates objects in the grid and provides a link to the object in response to a client request for the object. The OL is aware of job/requests and location of the associated objects through a registration process. FIGS. 5-13 illustrate various embodiments of the OL 500 and how it functions to process a request for an object on the grid 100.

Figure 5:
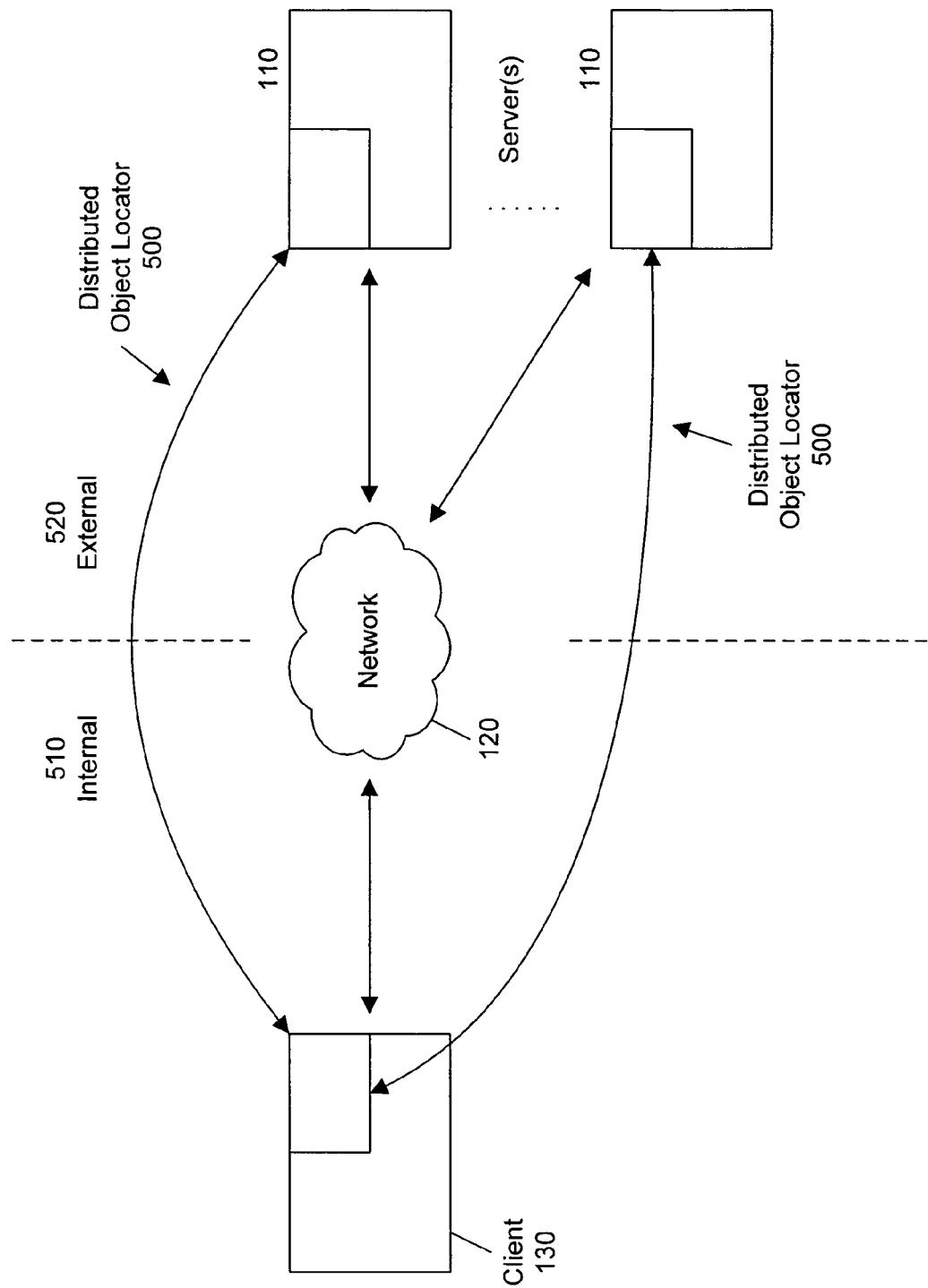
FIG. 5 illustrates a distributed object locator that resides on various computers of a grid according to one embodiment.
Figure 6:
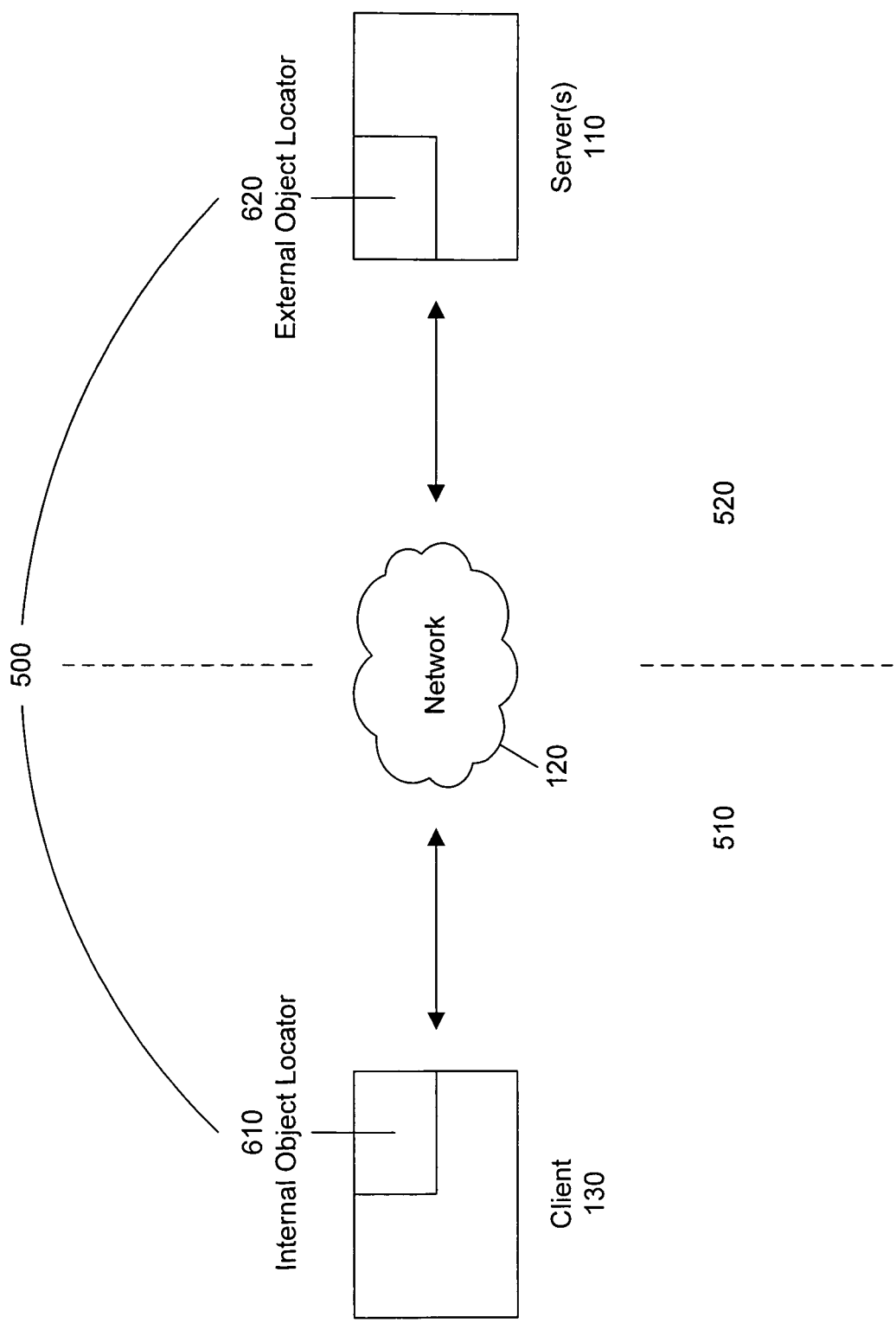
FIG. 6 further illustrates a distributed object locator having an internal object locator element and an external object locator element according to one embodiment.

Referring to FIGS. 5 and 6, according to one embodiment, a distributed OL 500 resides on a client 130 and one or more server(s) 110 in the grid 100. Thus the OL 500 is distributed throughout the grid 100. The environment on the client side is referred to as an internal 510, and on environment on the server side, i.e., across the network 120, is referred to as an external 520 environment. As illustrated in FIG. 6, the OL 500 includes a local or an internal OL element (IOL) 610 and an external OL element (EOL) 620. The IOL 610 resides in the client 430, and the EOL(s) reside on servers 110 across the network 120. The OL 500 can be embodied in software, hardware or a combination thereof. For purposes of explanation, this specification refers to an OL 500 software that resides on one or more computers. The embodiment shown in FIG. 5 illustrates the OL 500 being distributed among one client 130 and two servers 110 for purposes of illustration executed on a single computer or distributed among various numbers of computer, e.g., 10s, 100s, 1000s, etc. of servers 110. Accordingly, FIG. 5 is provided to illustrate that the OL 500 is software that is distributed and resides on different computers.

Figure 7:
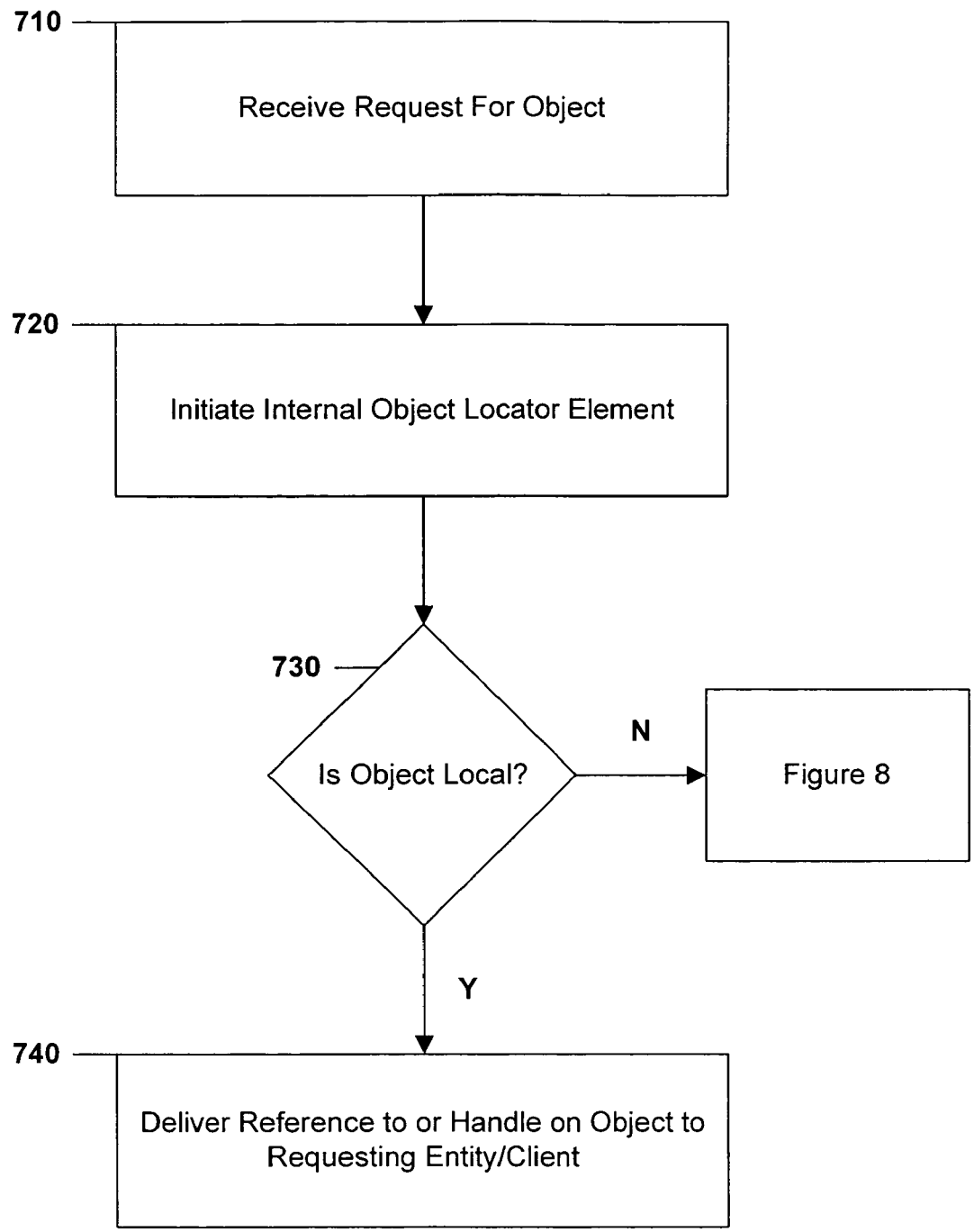
FIG. 7 is a flowchart illustrating a process for delivering a reference to or a handle on an object to a requesting entity according to one embodiment.

FIG. 7 is a flow chart illustrating one embodiment of a method performed by an OL 500 in a grid 100. The OL 500 essentially serves as a directory of objects on the grid 100 and provides a requesting entity with a connection to the requested object so that the requesting entity, such as client 130, object or process, can communicate with the object. For purposes of explanation, not limitation, this specification generally refers to a client or requesting entity as making a request for an object. Objects reside in process space. The OL 500 locates the requested objects by knowing where in the grid 100 the objects reside, and where in memory the objects are stored in process space in these grid 100 locations. In other words, the OL 500 determines on which host and process servers the requested object resides, and then hands the client 130 a connection to the requested object.

More particularly, initially, in step 710, a requesting entity issues a request for an object, which is received by the OL. The local or IOL 610 is initiated in step 720. The IOL determines whether the requested object is locally available on the client in step 730. More particularly, the IOL determines whether it has the requested object reference in its current process space, e.g., whether the IOL already served up the requested object in the current process of the client. The IOL searches the client to determine whether the client already includes a reference to the requested object. "Reference," as used in the specification, is defined to include a "reference" in the CORBA standard and, in addition, a reference to the location or path to an object, such as a location on a server or client, a location in memory, a location in a memory of a server, a handle (name or number or other identifier) on the object, a routing path to an object, and other appropriate identifiers and data to determine a location of or connection to an object in the grid. Thus, "reference" is not intended to be limited to only a reference as in the CORBA standard.

In step 740, the IOL may determine that the local client has a reference to requested object. In this case, the client can simply deliver the reference or a connection to the object to the client so that the client can communicate with the requested object. Otherwise, the IOL determines that the client does not have a reference to the requested object, and the process proceeds to FIG. 8.

Figure 8:
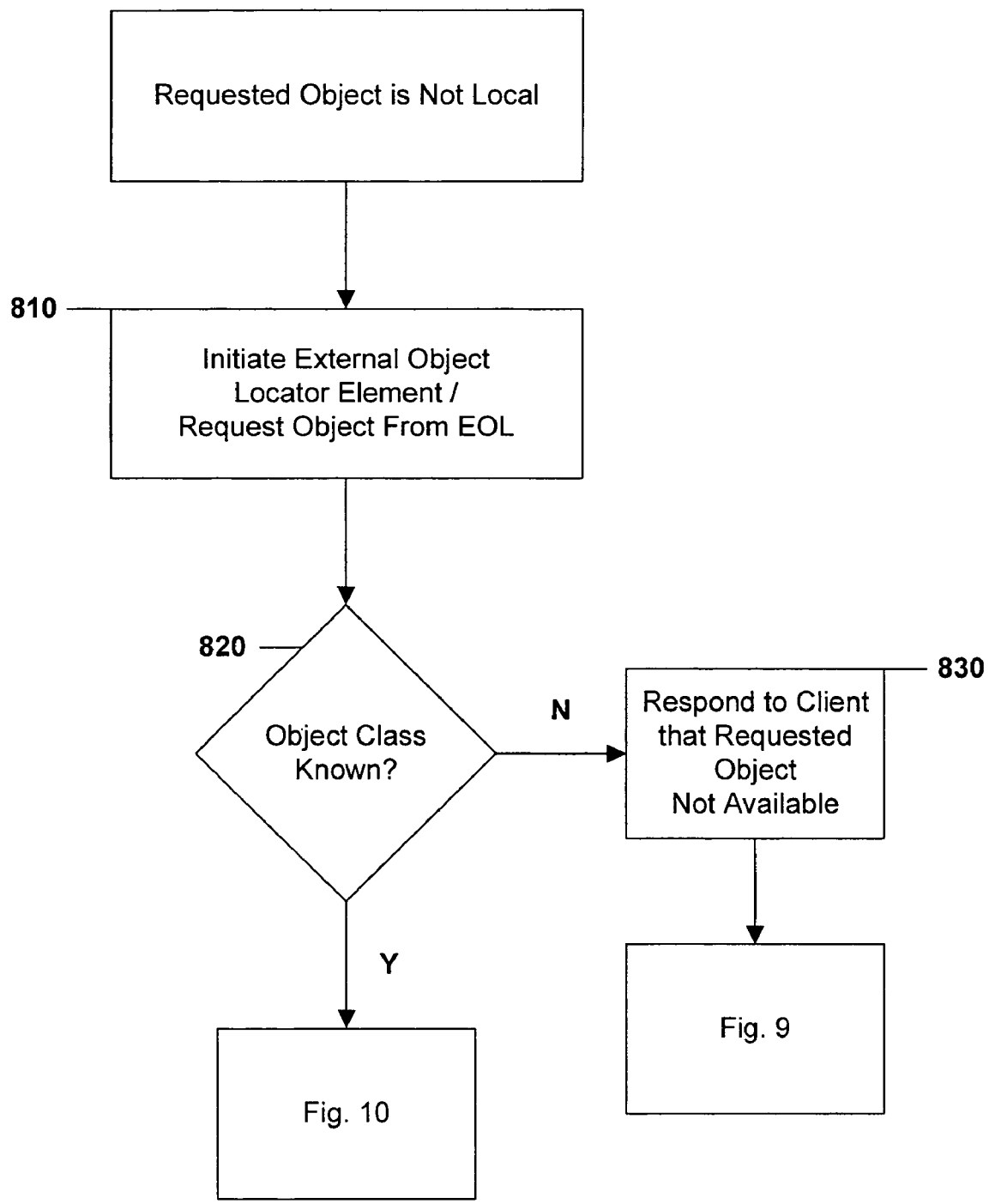
FIG. 8 is a flowchart illustrating a process for employing an external object locator element to locate objects on a grid according to one embodiment.

Referring to FIG. 8, in step 800, the requested object does not reside locally on the client. In step 810, EOL is initiated to search for the requested object beyond the current process of the client and across the network since the IOL is unable to locate the object locally. In step 820, the EOL determines whether the class of the object is known. If the class of the object is not known, in step 830, then the EOL responds to the client or IOL with a message indicating that the requested object does not exist or is unavailable. The flow chart then proceeds to FIG. 9. If the class of the object is known, then the system proceeds to FIG. 10.

Figure 9:
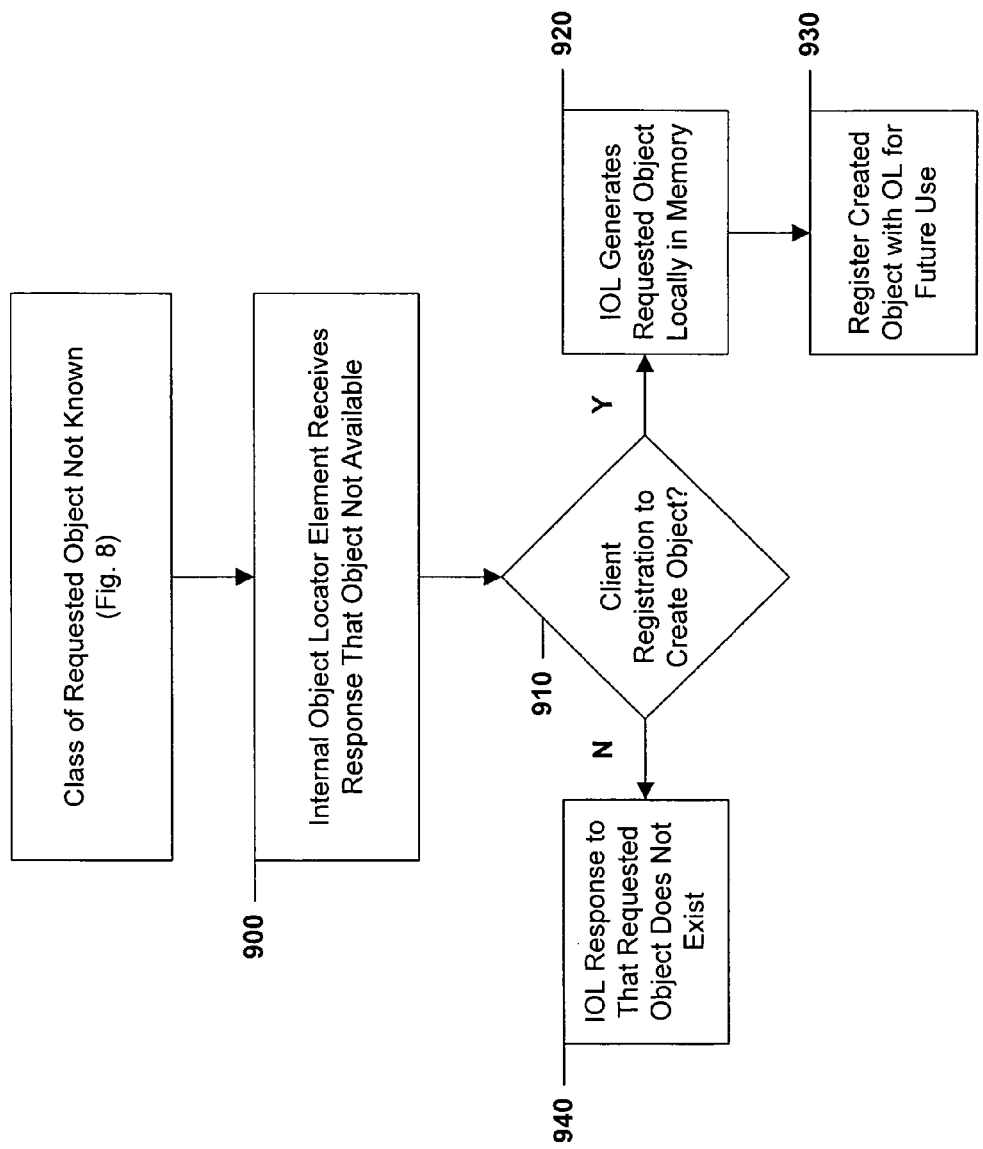
FIG. 9 is a flow chart illustrating a process for responding to a client when an internal object locator element responds that a requested object is not available according to one embodiment.

Referring to FIGS. 8 and 9 the object class is not known, and in step 900, the EOL sends a message to the IOL indicating that the requested object is unavailable. In step 910, the IOL determines the registration of the client. The client may be registered so that objects can be locally generated. In step 920, if the client is registered, then the IOL creates a local copy of the object in memory of the client. This created object may then be registered with the OL for future use in step 930. Otherwise, if the client is not registered for local generation of objects, then in step 940, the IOL responds to the client that the requested object is unavailable or does not exist.

Figure 10:
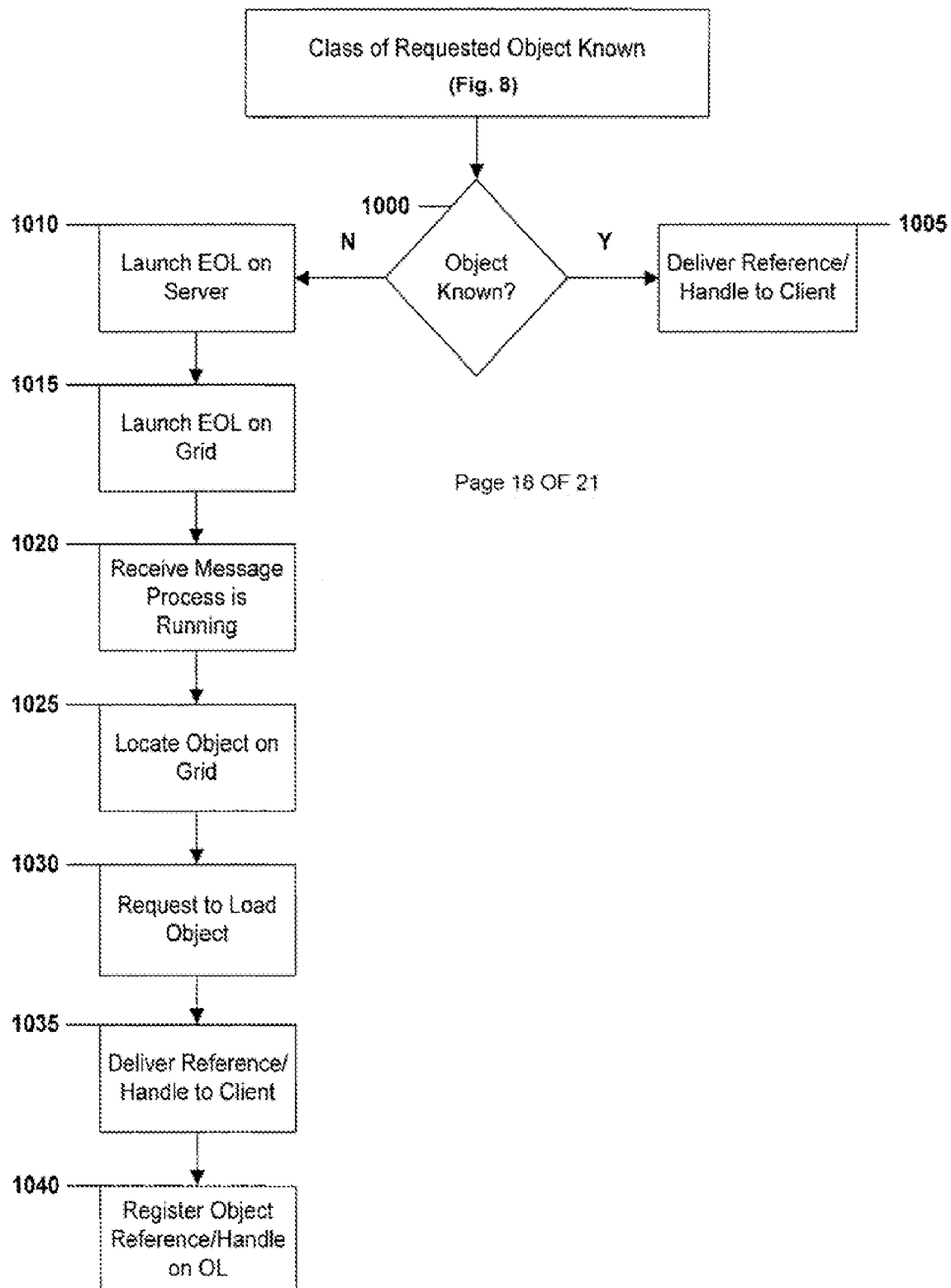
FIG. 10 is a flow chart illustrating a process for launching an external object locator element and delivering a reference to or a handle on the requested object to the requesting entity according to one embodiment.

Referring to FIGS. 8 and 10, the requested object is not local or internal but the class of the object is known. In step 1000, a determination is made whether the actual object is known from the class. In step 1005, the object is known, and the EOL can then deliver a reference or to connection to the requested object to the client. Otherwise, the object is not known, and in step 1010, the EOL is launched on a server and subsequently, launched on the grid in step 1015. A similar process as described above can then be performed on various resources across the grid while the requesting entity receives an in process message 1020. Once the object is located on the grid in step 1025, a request object load signal can be transmitted in step 1030, and the reference to or handle of the object can be provided to the requesting entity in step 1035. Once the handle of the object is known by the requesting entity, the system can register the object handle on the local POL in step 1040 for later use.

Figure 11:
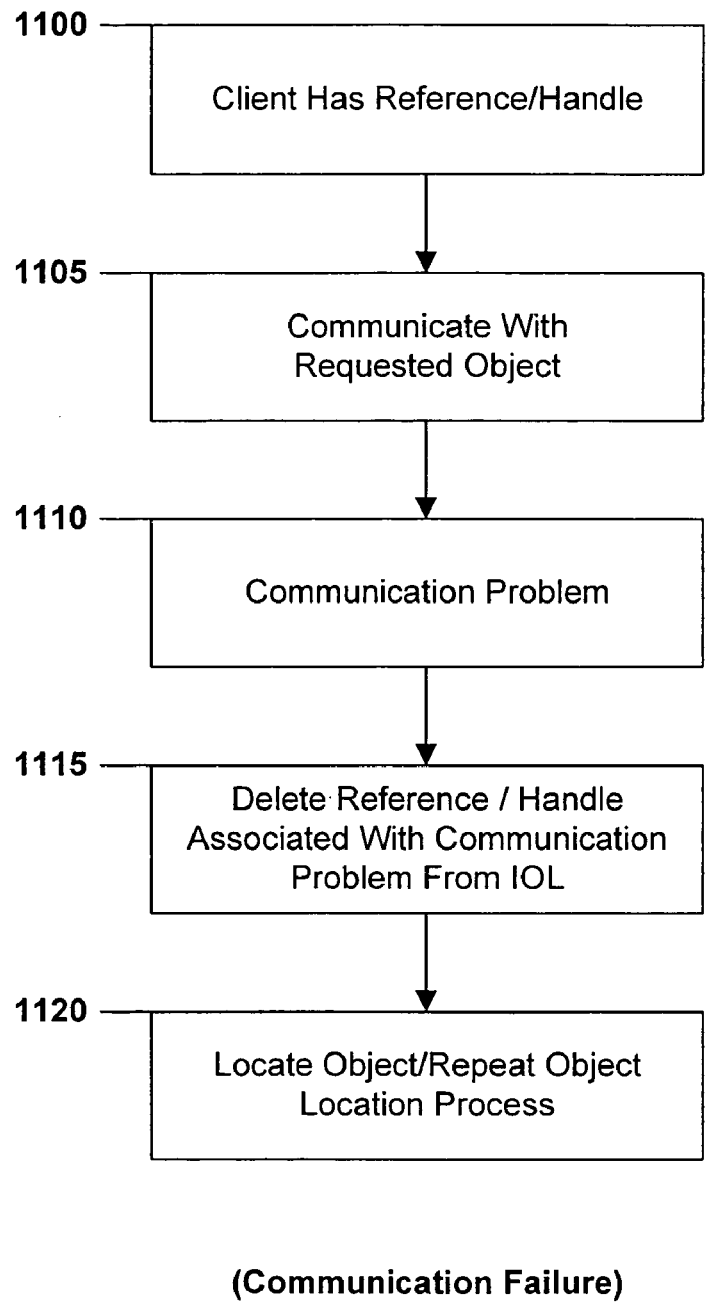
FIG. 11 is a flow chart illustrating a process for responding to a communication failure within a client by deleting a reference or handle according to one embodiment.
Figure 12:
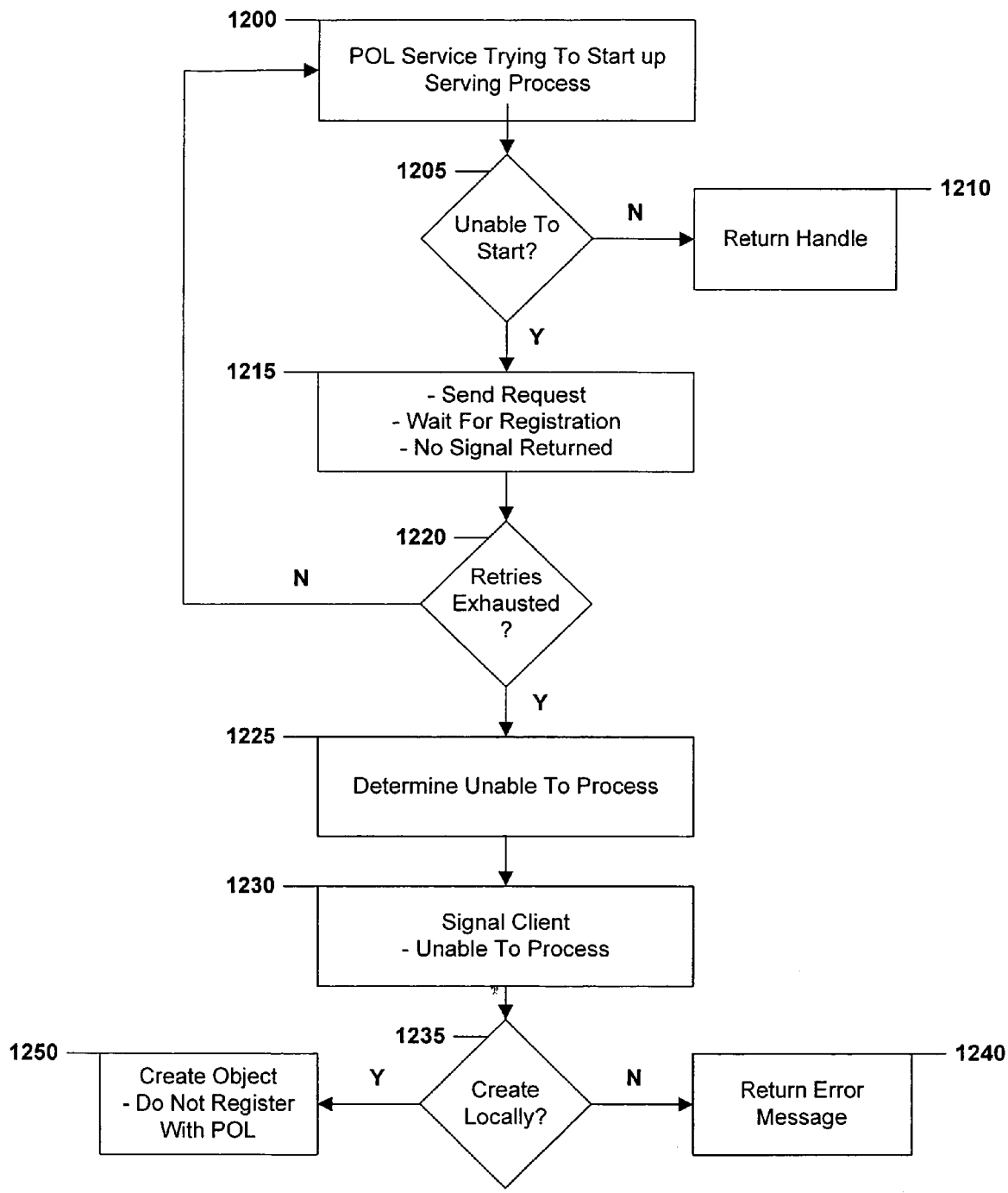
FIG. 12 is a flow chart illustrating a process for responding to failures in starting a server process and creating an object locally according to one embodiment.
Figure 13:
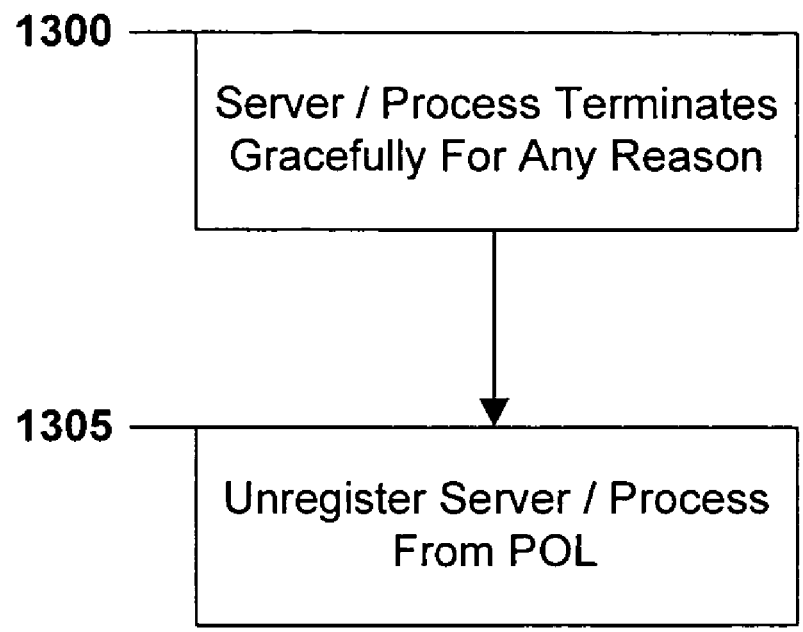
FIG. 13 is a flow chart illustrating an un-registration process according to another embodiment.

FIGS. 11-13 illustrate alternative embodiments that address communication failures, unsuccessful servers and registration changes in the event of an expected or acceptable termination of a server or process. One or more of the embodiments shown in FIGS. 11-13 may be used with embodiments described above.

Turning to FIG. 11, one embodiment is directed to addressing communication failures. The local machine or client may initially has a reference to or a handle on the object in step 1100 (per one of the methods described above) so that communication with the object is or was successfully performed in step 1105. However, a communication failure with the identified handle may occur in step 1110. The communication failure may result from, for example, the object being moved to another location or being deleted. Thus, the reference or handle is no longer valid. According to the embodiment, the system can then remove the registration of the handle from the local IOL in step 1115. The process of locating an object can be restarted in step 1120, per one or more of the object location methods involving an OL as described above.

FIG. 12 illustrates a further alternative embodiment in which the OL has begun the process of locating the reference to the object requested on an external server in step 1200, but the OL is unable to start a process to serve up the requested object from the external server. The OL fires off a server to be run in the grid and waits for a registration to come back from the server. In normal operation, the server responds by starting up the process and registering itself back to the OL. However, if the OL does not receive a response from the server, then the OL attempts to start the process to serve the object one or more additional times. If the required process does not initiate, then the OL responds to the client indicating that the object is not available or there is an error in the system. The client can then decide how to proceed.

More particularly, if the OL can start on the external server, then in step 1205, the OL returns the reference to or handle on the requested object in step 1210. Otherwise, the OL is unable to start on the server, and the OL sends a new request to start the OL and wait for registration in step 1215. If no registration is received from the server, the OL continues sending the server a signal until either the server is able to start and a handle is returned in step 1210, or until a timeout or a prescribed number of retries has been exhausted in step 1220.

If the prescribed number of retries has been exhausted, then the server is unable to process the request in step 1225. In this case, the OL returns signal to the requesting entity indicating that it is unable to process the request. The requesting entity can then determine whether to create the object locally in step 1235.

If the requesting entity does not create the object locally, an error message can be returned in step 1240. Otherwise, the requesting entity to creates the object locally in step 1250, using any known or convenient mechanism. In the embodiment shown in FIG. 12, it may or may not be necessary to register in the OL locally loaded objects since they are used locally.

With reference to FIG. 13, according to another embodiment, the server and/or process may terminate gracefully or as planned in step 1305. For example, the system can then unregister the server and/or process from the OL in step 1310. As a result, the faulty communication channel will not be available for future use.

In the foregoing specification, the embodiments have been described with reference to specific elements and steps thereof. It will, however, be evident that various modifications and changes may be made thereto without departing from the broader spirit and scope of the embodiments. For example, it is to be understood that the specific ordering and combination of process actions shown in the process flow diagrams described herein are merely illustrative, and that or additional process actions, or a different combinations and/or ordering thereof can be used. Further, OL system and method embodiments may be implemented in grids of various sizes and involve only one or multiple computers. The specification and drawings are, accordingly, to be regarded in an illustrative rather than restrictive sense.

What is claimed:

1. A computer implemented method of processing requests for objects in a distributed computing grid having a requesting entity or client and one or more computing nodes connected to the requesting entity or client through a network, the method comprising:

using a computer system which comprises at least one processor and is programmed for performing:

receiving a request from the requesting entity or client for an object residing on the distributed computing grid;

determining whether the requesting entity or client already includes a reference to an identifier of the object;

searching for the requested object on the distributed computing grid using a distributed object locator having an internal object locator element residing locally on the requesting entity or client and an external object locator element residing on one or more external computing nodes of the distributed computing grid, in which a first computing node on which the requesting entity or client resides is determined not to include the reference; and generating a local copy of the requested object in a non-transitory computer readable storage medium of the requesting entity or client, wherein the act of generating the local copy of the requested object in a non-transitory computer readable storage medium is based at least in part upon one or more criteria.

2. The computer implemented method of claim 1, the process for searching for the requested object comprising:

initially searching the requesting entity or client for a local reference to the requested object with the internal object locator element.

3. The computer implemented method of claim 2, wherein the requesting entity or client comprises the reference to the requested object, further comprising:

initiating a first process a first number of times on an external computing node by using the distributed object locator to serve up the requested object based at least in part upon a first criterion.

4. The computer implemented method of claim 2, the process for searching for the requested object comprising:

determining whether the requested object is in a process space of the requesting entity or client using the internal object locator element.

5. The computer implemented method of claim 2, the process for searching for the requested object comprising:

determining whether the requesting entity or client previously requested the same object using the internal object locator element.

6. The computer implemented method of claim 1, further comprising:

determining a class of the object that is requested.

7. The computer implemented method of claim 6, the process for searching for the requested object comprising:

searching for a process that handles the class of the requested object using the external object locator element.

8. The computer implemented method of claim 7, further comprising:

registering a process that handles the class of the requested object with the external object locator element; and requesting the registered process to load the requested object.

9. The computer implemented method of claim 1, further comprising delivering to the requesting entity or client the reference to the requested object using the external object locator element.

10. The computer implemented method of claim 9, further comprising communicating with the requested object using the delivered reference.

11. The computer implemented method of claim 1, in which the reference to the requested object comprises a location of the requested object in the distributed computing grid.

12. The computer implemented method of claim 11, in which the location of the object comprises a location of the requested object in a memory of a computing node of the one or more computing nodes in the distributed computing grid.

13. The computer implemented method of claim 1, in which the reference to the requested object comprises a handle on the requested object or a routing path to the requested object in the distributed computing grid.

14. The computer implemented method of claim 1, wherein the internal object locator element locally resides in a first process space in the requesting entity or client, and the external object locator element resides in a second process on an external computing node of the one or more computing nodes of the distributed computing grid.

15. The computer implemented method of claim 1, the process for searching for the requested object comprising:

searching a plurality of computing nodes of the distributed computing grid with the external object locator element.

16. The computer implemented method of claim 1, in which the distributed object locator is distributed among all computing nodes of the distributed computing grid.

17. The computer implemented method of claim 1, the process for receiving the request from the requesting entity or client comprising:

receiving a request from an object or a process executing on the requesting entity or client.

18. The computer implemented method of claim 1, the process for searching for the requested object further comprising:

searching the requesting entity or client for the requested object using the internal object locator element;

determining whether the requesting entity or client knows a reference to the requested object;

delivering the reference to the requested object if the reference is known;

communicating with the requested object using the reference; and if the connection between the requesting entity or client and the requested object fails, deleting the reference to the failed connection from memory.

19. The computer implemented method of claim 18, further comprising:

informing the internal object locator of the failed connection.

20. The computer implemented method of claim 18, further comprising:

requesting from the external object locator element the object with which the requesting entity or client previously communicated.

21. The computer implemented method of claim 1, further comprising:

attempting to register a process that handles a class of the requested object with the external object locator element; and in the event of a registration failure, repeating attempts to register the process until a prescribed number of attempts have been executed.

22. The computer implemented method of claim 21, wherein the process cannot be registered to load the requested object, further comprising informing the requesting entity or client that the requested object is not available.

23. The computer implemented method of claim 22, further comprising:

generating the requested object locally in the requesting entity or client, wherein the object it not registered with the distributed object locator.

24. The method of claim 1, further comprising:
unregistering a computing node process from the distributed object locator.

25. The computer implemented method of claim 24, the computing node process being unregistered when the computing node process is intentionally terminated.

26. The computer implemented method of claim 1, wherein the one or more criteria comprise at least one of:
determining whether the internal object locator element that resides locally on the requesting entity or client has found the requested object; and
determining whether the requesting entity or client has been registered for local generation of one or more objects.

27. A computer implemented method of processing requests for objects in a geographically distributed computing grid including a requesting entity or client and one or more computing nodes, connected to the requesting entity or client through a network comprising:
using a computer system which comprises at least one processor and is programmed for performing:
receiving a request from the requesting entity or client for an object residing on the geographically distributed computing grid;
initially searching the requesting entity or client for the requested object using an internal object locator element of a distributed object locator, the internal object locator element residing locally on the requesting entity or client, wherein
if the internal object locator element knows a reference to the requested object,
delivering the reference to the requested object, and communicating with the requested object using the delivered reference
else searching for the requested object across the network on one or more computing nodes of the geographically distributed computing grid using an external object locator element of the distributed object locator; and
generating a local copy of the requested object in a non-transitory computer readable storage memory of the requesting entity or client, wherein the internal object locator element cannot find the requested object locally on the requesting entity or client.

28. The computer implemented method of claim 27, further comprising:
determining a class of the requested object.

29. The computer implemented method of claim 28, in which the action for searching for the requesting entity or client for the requested object across the network comprises:
searching for a process that handles the class of the requested object using the external object locator element.

30. The computer implemented method of claim 29, further comprising:
registering a process that handles the class of the requested object with the external object locator element; and
requesting the registered process to load the requested object.

31. The computer implemented method of claim 27, further comprising:
initiating a first process a first number of times on an external computing node of the one or more computing nodes by using the distributed object locator to serve up the requested object based at least in part upon a first criterion.

32. The computer implemented method of claim 31, further comprising:
communicating with the requested object using the delivered reference.

33. The computer implemented method of claim 27, in which the reference to the requested object comprises a location of the requested object in the geographically distributed computing grid.

34. The computer implemented method of claim 33, in which the location of the object comprises a location of the requested object in a memory of a computing node in the geographically distributed computing grid.

35. The computer implemented method of claim 27, in which the reference to the requested object comprises a handle on the requested object or a routing path to the requested object.

36. The computer implemented method of claim 27, wherein the internal object locator element resides locally in a first process space in the requesting entity or client, and the external object locator element resides in a second process on an external computing node across the network of the geographically distributed computing grid.

37. The computer implemented method of claim 27, the distributed object locator being distributed among all computing nodes of the geographically distributed computing grid.

38. A system for processing requests for objects in a distributed computing grid having a requesting entity or client and one or more computing nodes connected to the requesting entity or client through a network, comprising:
a computer system which comprises at least one processor and further comprises:
an internal object locator element residing locally on the requesting entity or client;
an external object locator element invocation unit which causes an external object locator element that resides on one or more computing nodes across the network to be initiated, wherein
the internal object locator element receives a request from the requesting entity or client for an object residing on the distributed computing grid, and initially searches for the requested object locally on requesting entity or client, and
if the internal object locator element does not locate the requested object, the external object locator element is used to search for the requested object in one or more computing nodes across the network; and
a local copy generation module that is programmed for generating a local copy of the requested object in a non-transitory computer readable storage memory of the requesting entity or client when the internal object locator element cannot find the requested object locally on the requesting entity or client.

39. The system of claim 38, wherein the external object locator element searches for a class of the requested object.

40. The system of claim of claim 38, wherein the internal object locator element resides locally in a first process space in the requesting entity or client, and the external object locator element resides in a second process space on an external computing node across the network.

41. The system of claim 38, wherein the external object locator element resides on a plurality of computing nodes of the distributed computing grid.

42. The system of claim 38, wherein a distributed object locator, which comprises the internal object locator element or the external object locator element, is distributed among the requesting entity or client and all of the computing nodes of the distributed computing grid.

43. The system of claim 38, wherein the distributed computing grid is a geographically distributed computing grid.

44. An article of manufacture comprising a non-transitory computer readable storage medium having stored thereupon a sequence of instructions which, when executed by at least one processor of a computer system, causes the at least one processor of the computer system to execute a process for processing requests for objects in a distributed computing grid having a requesting entity or client and one or more computing nodes connected to the requesting entity or client through a network, the process comprising:

using the computer system which comprises the at least one processor and is programmed for performing:

receiving a request from the requesting entity or client for an object residing on the distributed computing grid;

determining whether the requesting entity or client already includes a reference to an identifier of the object;

searching for the requested object on the distributed computing grid using a distributed object locator having an internal object locator element residing locally on the requesting entity or client and an external object locator element residing on one or more external computing nodes of the distributed computing grid, in which a first computing node on which the requesting entity or client resides is determined not to include the reference; and generating a local copy of the requested object in a non-transitory computer readable storage medium of the requesting entity or client, wherein the act of generating the local copy of the requested object in a non-transitory computer readable storage medium is based at least in part upon one or more criteria.

45. The article of manufacture of claim 44, wherein the one or more criteria for the act of generating the local copy of the requested object comprises at least one of:

determining whether the internal object locator element that resides locally on the requesting entity or client has found the requested object; and determining whether the requesting entity or client has been registered for local generation of one or more objects.

* * * * *